United States Patent [19]

Steidl

[11] 4,125,745
[45] Nov. 14, 1978

[54] METHOD AND APPARATUS FOR SIGNALING AND FRAMING IN A TIME DIVISION MULTIPLEX COMMUNICATION SYSTEM

[75] Inventor: Robert E. Steidl, Columbus, Ohio

[73] Assignee: International Telephone and Telegraph Corporation, New York, N.Y.

[21] Appl. No.: 805,814

[22] Filed: Jun. 13, 1977

[51] Int. Cl.² .............................................. H04J 3/06
[52] U.S. Cl. ............................ 179/15 BY; 179/15 BS
[58] Field of Search ............. 179/15 BY, 15 BS, 15 A

[56] References Cited

U.S. PATENT DOCUMENTS

| | | | |
|---|---|---|---|
| 3,686,443 | 8/1972 | Kavanaugh et al. | 179/15 BY |
| 3,909,540 | 9/1975 | Maryscuk et al. | 179/15 BY |
| 3,940,563 | 2/1976 | Susset | 179/15 BS |
| 3,970,799 | 7/1976 | Colton et al. | 179/15 BY |
| 4,016,368 | 4/1977 | Apple | 179/15 BS |

OTHER PUBLICATIONS

"Study of a Rural Digital End Office" by Kelly in Conference Record of International Switching Symposium, Kyoto, Japan, Oct. 25–29, 1976.

Primary Examiner—Douglas W. Olms
Attorney, Agent, or Firm—James B. Raden; Marvin M. Chaban

[57] ABSTRACT

A TDM communication method and system provides signaling between a digital central office and a remote line switch over a T1 line involving combined common-channel and D2 signaling with retention of twenty-four PCM communication channels. The invention also embodies novel means and techniques for out-of-frame detection and reframing.

11 Claims, 25 Drawing Figures

DIGITAL SWITCHING SYSTEM

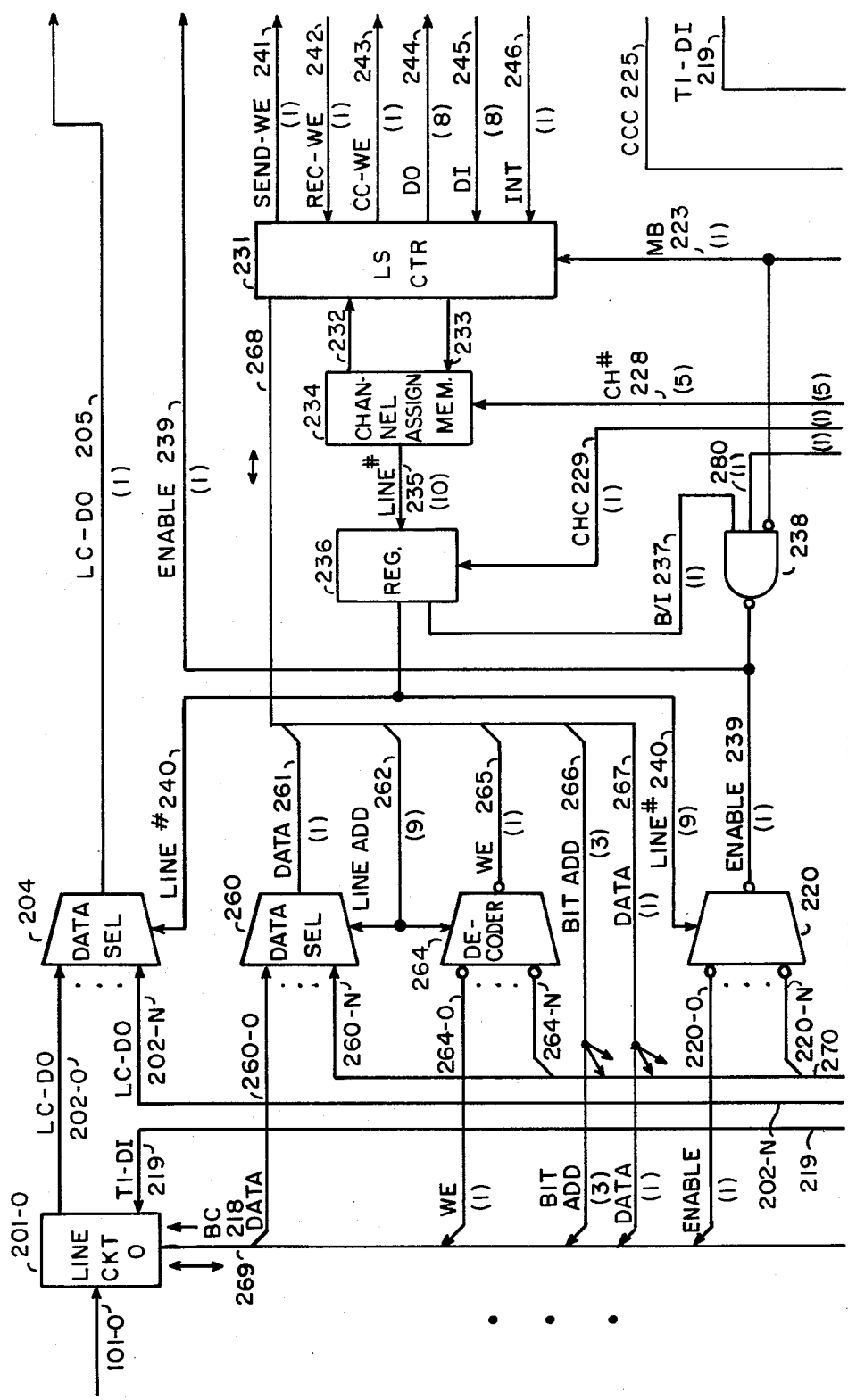
FIG.2A. LINE SWITCH LS

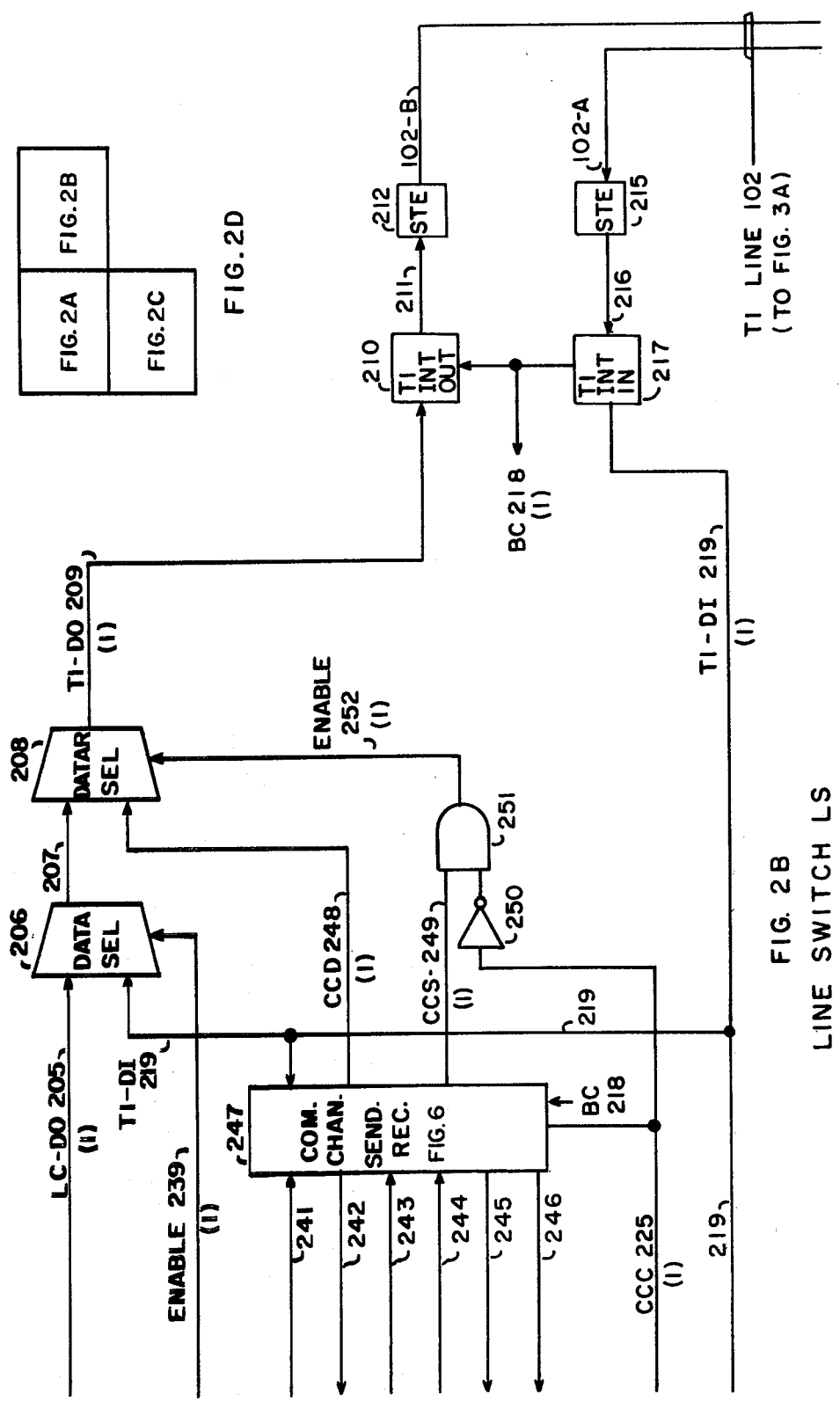
FIG. 2B LINE SWITCH LS

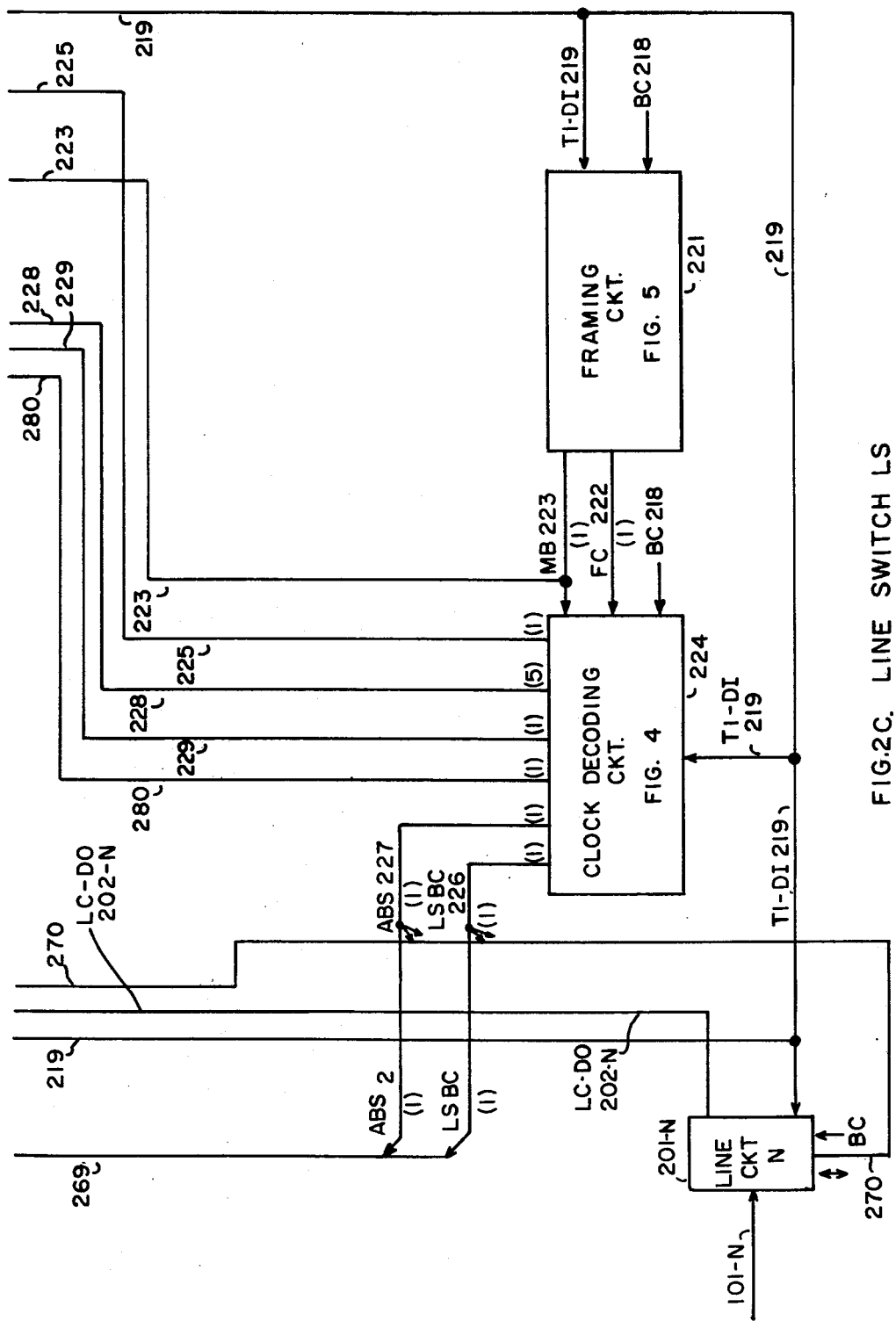
FIG.2C. LINE SWITCH LS

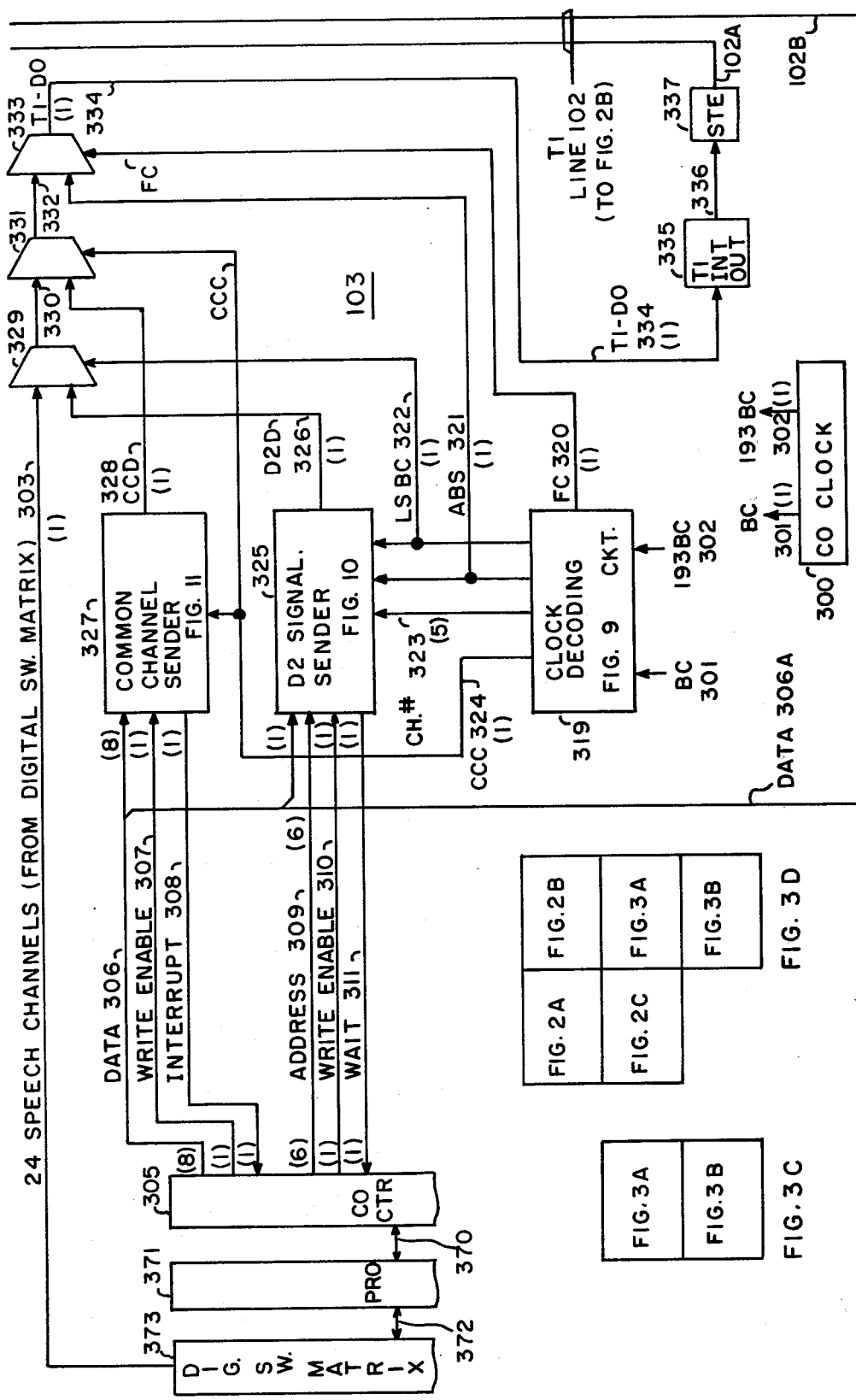

DIGITAL CENTRAL OFFICE

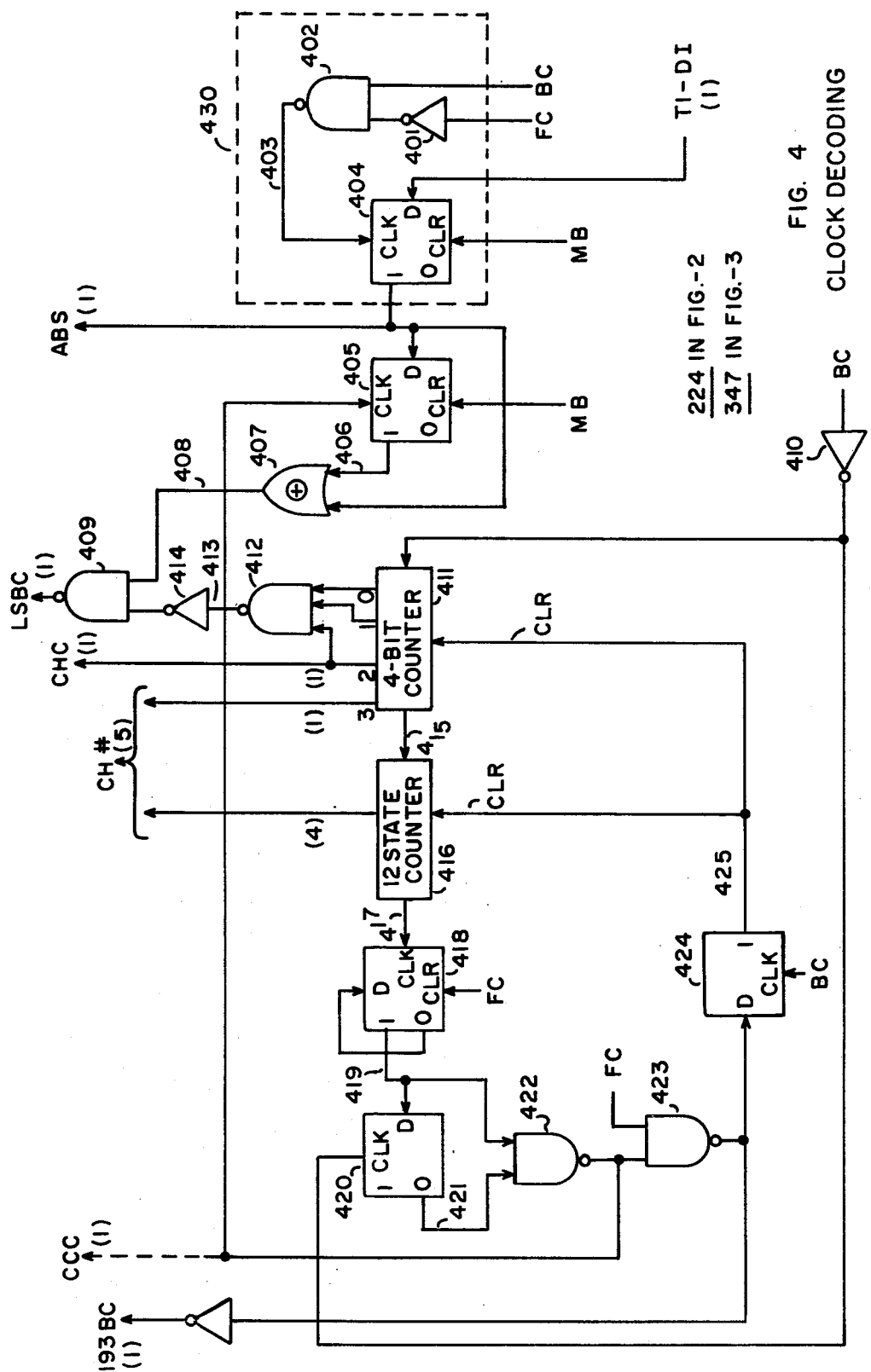

| STATE # | FC (INPUT) | CCC (OUTPUT) | 193BC (OUTPUT) | FLIP-FLOP 424 (I-OUTPUT) | FLIP-FLOP 420 (O-OUTPUT) | FLIP-FLOP 418 (I-OUTPUT) | DECIMAL EQUIVALENT STATE OF COUNTERS 411 AND 416 | DESRIPTION |
|---|---|---|---|---|---|---|---|---|
| 0 | — | — | 0 | 0 | 0 | 0 | 0 | 24 CHANNELS |
| 1 | — | — | 0 | 0 | 0 | 0 | 1 | |
| 2 | — | — | 0 | 0 | 0 | 0 | 2 | |
| ••• | ••• | ••• | ••• | ••• | ••• | ••• | ••• | |
| 191 | — | — | 0 | 0 | 0 | 0 | 191 | |
| 192 | — | 0 | 1 | — | 0 | — | 0 | CC BIT |
| 193 | — | — | 0 | 0 | — | — | 0 | 24 CHANNELS |
| 194 | — | — | 0 | 0 | — | — | 1 | |
| 195 | — | — | 0 | 0 | — | — | 2 | |
| ••• | ••• | ••• | ••• | ••• | ••• | ••• | ••• | |
| 384 | 0 | — | 0 | 0 | — | — | 191 | |
| 385 | — | — | 0 | — | 0 | 0 | 0 | FRAMING BIT |
| 0 | — | — | 0 | 0 | 0 | 0 | 0 | |

FIG. 4A CLOCK DECODING COUNTER STATES (AS FOUND IN FIG. 4)

FRAMING CIRCUIT

"385" DETECTOR

FRAMING CIRCUIT TIMING

VIOLATION DETECTOR

NORMAL MODE STATE DIAGRAM

SEARCH MODE STATE DIAGRAM

COMMON-CHANNEL SENDER-RECEIVER

COMMON-CHANNEL RECEIVER

D2 SIGNALING RECEIVER

CLOCK DECODING

COMMON CHANNEL SENDER

D2 SIGNALING SENDER

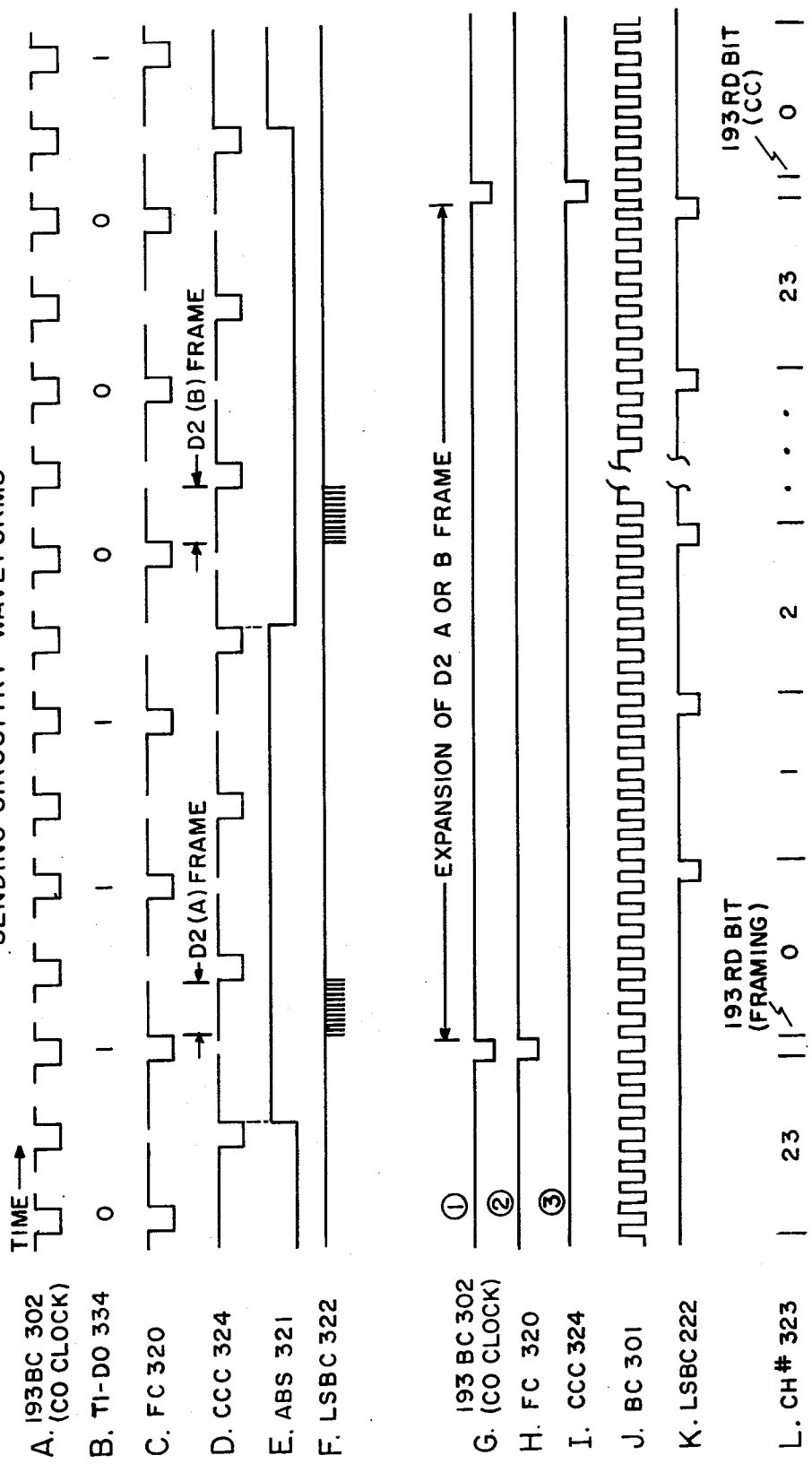

RECEIVING CIRCUITRY WAVEFORMS

LINE CIRCUIT

METHOD AND APPARATUS FOR SIGNALING AND FRAMING IN A TIME DIVISION MULTIPLEX COMMUNICATION SYSTEM

BACKGROUND OF THE INVENTION

The present invention relates to PCM signaling and reframing arrangements in digital telephone communication systems using frame-organized data or speech transmission. The conventional D2 channel-bank pattern employs the 193rd bit of odd frames to provide a repeating pattern 1010... for framing synchronization. The 193rd bit of even frames is utilized to provide a repeating pattern 000111... for identification by 01 and 10 transitions of the sixth and twelfth frames. The eighth bit of each channel may then be used for supervisory signaling related to the respective channel.

This conventional pattern does not provide for common-channel signaling in combination with D2 signaling over the same T1 line. Such would be very desirable for signaling between a digital central office and a remote line switch for many reasons, for example the following:

(1) Command information from a remote line switch to a digital central office may be necessary for functions such as (a) reporting line new seizures which the line switch has detected by scanning, (b) reporting faults detected by the line switch, and (c) reporting the results of a party test.

(2) Command information from a digital central office to a remote line switch may be necessary for functions such as (a) requesting assignment of a line to a channel of the T1 line, (b) requesting release of a line from a channel of the T1 line, (c) requesting ringing to a line, including the appropriate ringing code, (d) requesting testing of a line, (e) requesting coin control in the case of a coin telephone line, (f) requesting maintenance functions to be performed, and (g) requesting a party test to identify the party originating a call on a multiparty line.

(3) Command information may also be required between a controller at the digital central office and a controller at the remote line switch. A common-channel signaling method would be a desirable approach to provide a dedicated communication link between the two control units.

(4) In addition to command signaling, it may be necessary to provide supervisory signaling between the remote line switch and the digital central office for lines that have been assigned a channel. This includes sending of dial pulses, hook flashes, and disconnect signals between a subscriber line circuit and the digital central office. In certain cases, it is also desirable to send supervisory information from the digital central office to special line circuits. For example, in certain cases it is necessary to return answer supervision to the line circuit and cause a battery reversal on the subscriber line. D2 signaling presents the preferred method for communicating supervisory information and dial pulse information between the remote line switch and the digital central office. With this approach, supervisory and dial pulse signaling from subscriber lines appear at the central office to be very similar to trunk signaling. Thus, much of the pulse receiving and supervisory logic at the central office can then be shared between handling of lines and trunks.

Using D2 signaling for supervisory and dial pulsing information presents problems in that it has previously not been feasible to combine common-channel and D2 signaling on a T1 line. Some possible solutions to this problem that have previously been suggested include the following:

(1) Use only common-channel signaling. With this approach, the logic in the remote line switch is considerably increased, since the remote line switch must perform dial-pulse counting, flash detection, and disconnect timing. Also, this approach is rather inflexible for future possible additions, such as incerting trunk circuits in a remote line switch. If D2 signaling is provided on the T1 line, the signaling facilities are fully available to provide the necessary supervisory signaling to these trunk circuits controlled by the central office logic. However, if only common-channel signaling is available, the remote line-switch logic must further be increased to provide the necessary trunk signaling such as winks, delayed dials, etc.

(2) Use D2 signaling along with one of the 24 speech channels as a common channel. This approach is undesirable since it reduces the traffic handling capacity of the T1 line to 23 channels.

Following are brief comments on three prior-art U.S. patents that are illustrative of the present state of the art:

U.S. Pat. No. 3,541,456. This patent shows a fast reframing arrangement for reframing on a repeating 10 or 01 logic pattern. Every bit in a frame is examined to find one and only one which becomes the framing candidate without following this with a confidence check. This patent does not teach the concept of sharing normal mode violation detection circuitry with reframing circuitry. This circuit does not teach combined common-channel and D2 signaling. This circuit does not employ a ROM-controlled sequential machine nor RAM storage.

U.S. Pat. No. 3,940,563. This patent discloses a method for reframing on a digital logic pattern comprising a combination of repeating 010101 and 000111 patterns on a T1 line from a D2 channel bank to reduce the probability of falsely framing on a 2 KHz tone. This patent does not examine all bits of a frame but looks for one and only one framing candidate. Hence, it might reframe falsely on a spurious candidate. This method does not provide combined common-channel and D2 signaling. This patent does not teach the use of a ROM-controlled sequential machine nor RAM storage of all framing bit candidates.

U.S. Pat. No. 4,016,368. This patent, granted Apr. 5, 1977, is assigned to the same assignee as the present invention. It discloses a ROM-controlled sequential machine providing normal mode-violation detection, with guards against transient triggering, and search mode for reframing. However, this disclosure does not employ RAM storage for all framing bit candidates, and does not teach the examination of all bits of a frame for one and only one framing candidate. Hence, it does not provide as high a degree of protection against reframing on a spurious candidate as the present invention. Neither does this system provide for combined common-channel and D2 signaling.

SUMMARY OF THE INVENTION

Objects

It is an object of the present invention to provide improved signaling methods and means for combining common-channel signaling and D2 signaling over the same digital transmission line while yet retaining all PCM communication channels for regular communication service. It is also an object of the invention to provide fast out-of-frame detection and reframing.

Summary Description

The present invention provides arrangements for frame synchronization on the 000111 . . . pattern without disturbing the conventional usage of this pattern, as described above, thus freeing the bit position of the 1010 . . . pattern for common channel signaling. This is accomplished in a four-kilobit channel over which eight-bit bytes, conveying common channel commands, are transmitted for accumulation. When no command is being sent, a synchronization byte 10111000 is continuously sent in the common channel. The start of command is indicated by a non-synchronization byte. A common-channel command is terminated by returning to transmission of synchronization bytes.

The invention also includes novel out-of-frame detection and reframing arrangements involving normal and search modes. In the normal mode, the framing circuitry samples only the framing bit position (i.e., the 193rd bit of even frames) to monitor for the out-of-frame condition. In the search mode, the framing circuitry tests 386 consecutive bit positions until a framing violation occurs in all bit positions except one. Thus, there is no danger of reframing on a non-framing bit that temporarily contains the framing pattern, as with conventional framing circuits that test a subset of the bit positions at a time. This requires examining three previous samples of each bit position along with the current sample, since the framing pattern is 000111. . . Of sixteen possible combinations of these four bits, six combinations are valid patterns and ten are invalid.

The present invention also provides for frame synchronization on certain other six-bit patterns, providing combined common-channel signaling and D2 signaling.

BRIEF DESCRIPTION OF THE DRAWINGS

FIGS. 2A, 2B, and 2C, when arranged as shown in FIG. 2D, form a more detailed block diagram of a line switch shown in FIG. 1. FIGS. 3A and 3B, when arranged as shown in FIG. 3C, form a more detailed block diagram of the digital central office of FIG. 1. Furthermore, when FIG. 2B is placed above FIG. 3A, as shown in FIG. 3D, then FIGS. 2 and 3 are interconnected to form a complete digital switching system as represented in FIG. 1. One-line diagrams have been used to represent communication and control channels in FIGS. 1, 2, and 3, to avoid undue complexity in the diagrams. However, it will be understood by those skilled in the communication art that many channels may consist of multiple paths. For example, in the illustrative embodiments of FIGS. 2 and 3, the actual numbers of paths represented by one line and indicated in some cases by adjacent numerals within parentheses.

FIG. 4 is a detailed block diagram of a clock decoding circuit shown in the receiving paths of FIGS. 2 and 3.

FIG. 4A is a chart showing clock-decoding counter states of FIG. 4.

FIG. 12 depicts sending circuitry waveforms, digital streams and channel designations at the digital central office, including the central office bit clock BC and 193 BC. These are designated A - L and are correlated with various components in FIGS. 2 and 3.

GENERAL DESCRIPTION

At the outset, it should be observed that, although the present invention is presented herein for simplicity of illustration in the context of a digital central office with signaling circuits on a per-T1-line basis, the invention is also applicable in the context of a digital central office in which signaling circuits are on a superhighway basis after multiplexing several T1 lines.

Figure 1:
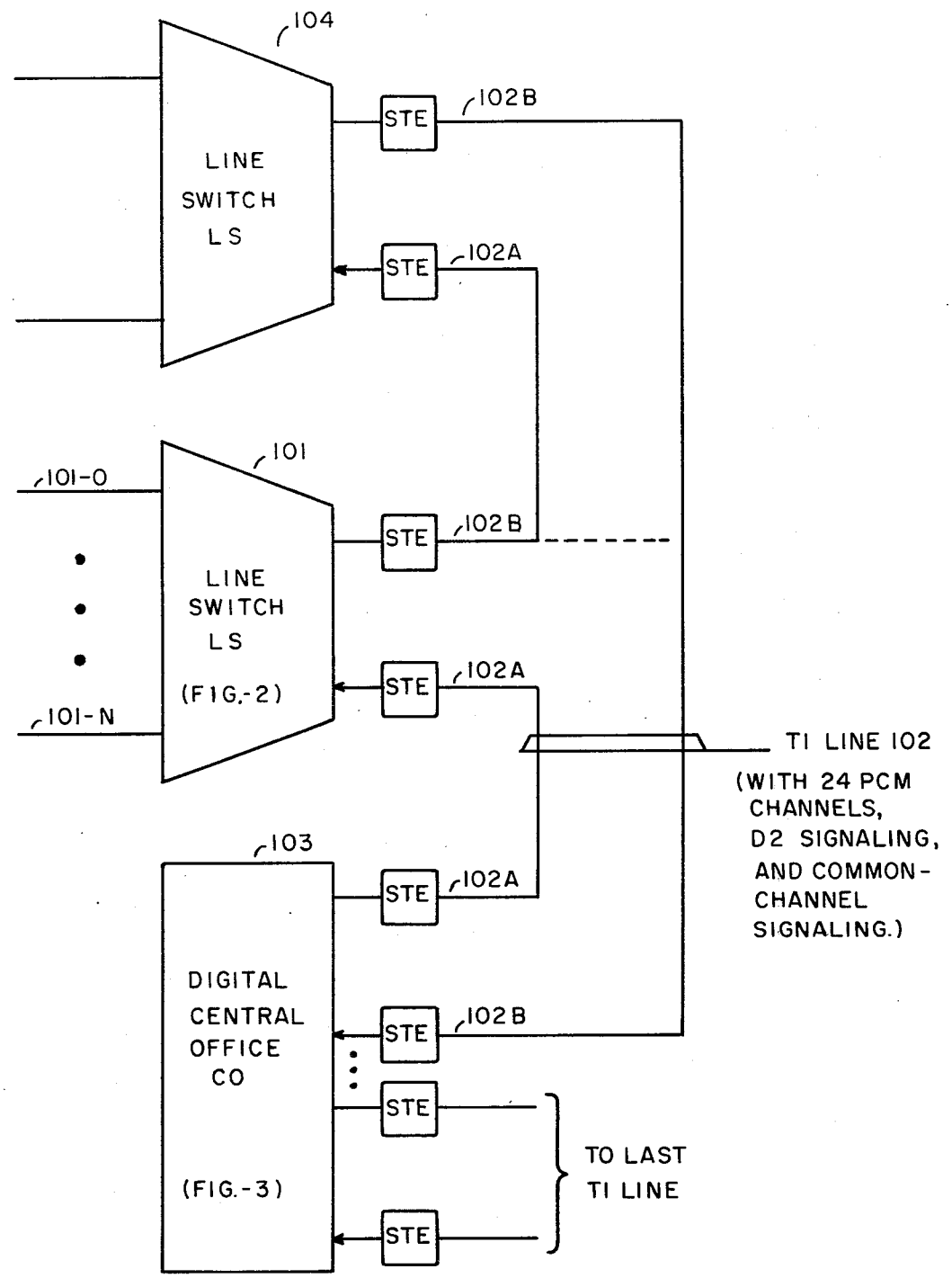
FIG. 1 is a system block diagram of a digital switching system incorporating the invention.

Referring first to FIG. 1, a digital switching system is shown for setting up and releasing communications including telephonic connections. A remote line switch LS designated 101 serves a plurality of paths 101-0 to 101-N which may comprise lines or trunks. Line switch 101 is shown interconnected in series with another line switch 104 over a T1 line 102 (including span termination equipment units STE) with a digital central office 103. Additional line switches may also be connected in the loop. The various line switches share the channels of the T1 line. If line switch 101 is the only line switch, the illustrated dotted connection 105 would apply. Normally, two T1 lines would be provided between line switches and digital central office, but only one is shown for simplicity of illustration. PCM transmission from the digital central office to the line switch takes place over path 102A which comprises two conductors, as is well understood, and PCM transmission from the line switch to the digital central office takes place over path 102B which also comprises two conductors. According to the invention, common-channel signaling and D2 signaling are provided over the T1 line in combination with the conventional twenty-four communications channels. As indicated in FIG. 1, further details of the line switch LS will be found in FIG. 2; and further details of the digital central office will be found in FIG. 3. As indicated in FIG. 1, the digital central office may serve a plurality of line switches.

Refer next to FIGS. 2 and 3. When FIG. 2B is placed above FIG. 3A, together they form a single line switch interconnected with a digital central office. It will be seen that a path from FIG. 3 to FIG. 2 includes T1 data out-path (T1-DO) designated 334, T1 interface-out 335 (which effects unipolar to bipolar signal conversion), path 336, span termination equipment STE designated 337, path 102A from FIG. 3A to FIG. 2B, span-terminating equipment 215, path 216, T1 interface-in 217 (which effects bipolar to unipolar signal conversion), and T1 data-in path (T1-DI) designated 219. Also, it will be seen that a path from FIG. 2B to FIG. 3A includes a T1 data outpath (T1-DO) designated 209, T1 interface-out 210 (which effects unipolar to bipolar conversion), path 211, span-termination equipment 212, path 102B from FIG. 2B to FIG. 3A, span-termination equipment 339, path 340, T1 interface-in 341, (which provides bipolar to unipolar signal conversion), and T1 data-in path (T1-DI) designated 342. Repeaters (not shown) may optionally be included in the T1 paths.

Figure 3B:
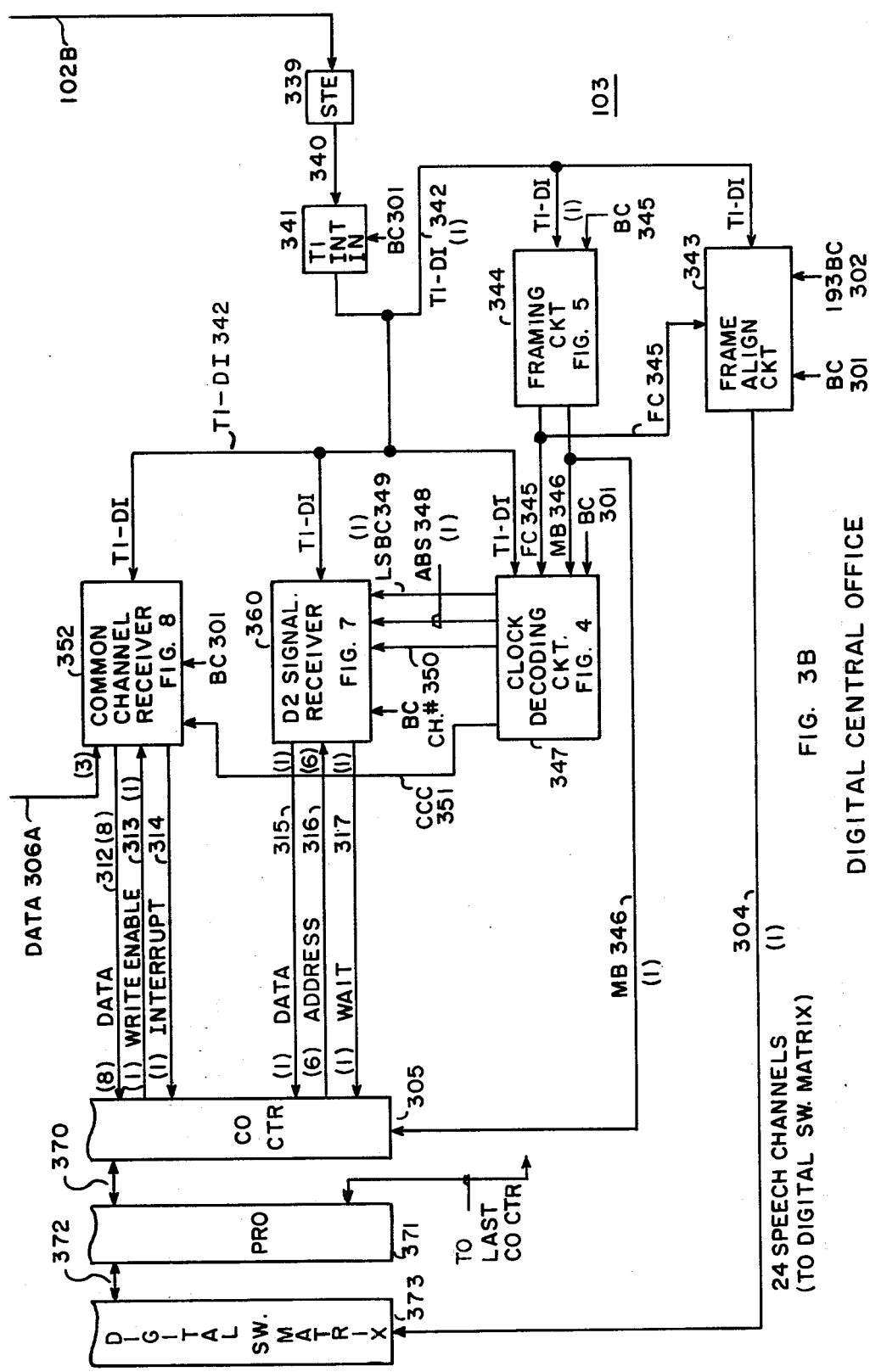

Common-channel signaling provides a dedicated four-kilobit communication link between the line-switch controller LS-CTR, designated 231 in FIG. 2A, and the digital central office controller CO-CTR (which may be a microprocessor) designated 305 in FIG. 3B. This involves the common-channel sender-receiver 247 in FIG. 2B, the common-channel sender 327 in FIG. 3A and the common-channel receiver 352 in FIG. 3B.

Typical common-channel commands sent by the line switch LS to the digital central office CO include the following:

1. Report of line seizures which the line switch has detected by scanning.
2. Report of a fault detected in the line switch.
3. Report of a party test result.

Typical common-channel commands sent by the digital central office to the line switch include the following:

1. Request for assignment of a subscriber line to a channel or release of a line from a channel.
2. Request for ringing to a line, including the appropriate ringing code.
3. Request for testing of a line.
4. Request for coin control in the case of a coin telephone.
5. Request for maintenance functions to be performed.
6. Request for party test to identify the party on the line.

D2 signaling provides for communication of supervisory information between line circuits, such as 201-0 and 201-N in FIGS. 2A and 2C and the digital central office controller CO CTR, designated 305 in FIG. 3B, for lines and trunks which have been assigned a channel. This involves D2 signal sender 325 in FIG. 3A and D2 signal receiver 360 in FIG. 3B. This includes sending of dial pulses, hook flashes, and disconnect signals between a subscriber line circuit and the digital central office. As is best shown in the detailed line switch circuits of FIG. 14, these are sent via the A and B bits from the line circuit control 1410 through the data selector 1408. In certain cases, it is also desirable to send supervisory information from the digital central office to special line circuits via the flip-flops 1430 and 1429 and the A and B leads to the line circuit control 1437. For example, in certain cases, it is necessary to return dial start and answer supervision to the line circuit and battery reversal on the line. With this approach, supervisory and dial pulse signaling from subscriber lines appears at the central offices very similar to trunk signaling. The full D2 signaling capability between a line card in a remote LS and the central office allows flexibility for connecting any type of trunk circuit in a remote LS (e.g., a ground start trunk for interfacing to a PBX in the area of the remote LS). Data selectors, such as 1408 in FIG. 14, 204 in FIG. 2A, and 206 and 208 in FIG. 2B, select appropriate inputs for properly formatting the information to be sent from the line switch over the T1 line to the digital central office. Timing for this purpose will be discussed hereinafter. Data selectors 329, 331, and 333 in FIG. 3A select appropriate inputs as shown for properly formatting the information to be sent from the digital central office over the T1 line to the line switch. Timing for this purpose will be discussed hereinafter.

The digital central office 103, as illustrated in FIG. 3, contains a controlling central office clock (CO clock), designated 300 in FIG. 3A, which provides 1.544 megabit clock impulses for the central office over path BC designated 301. This clock also provides an output pulse 193 BC over path 302 to the central office during each 193rd bit. The BC impulses are illustrated in the timing diagrams of A, G, and J of FIG. 12. These bit-clock signals and 193rd-bit clock signals control the clock decoding circuit 319 in FIG. 3A, which in turn controls signals over the T1 line from the central office to the line switch. Although transmission delay occurs over the T1 line connections, the T1 interface-in (T1 INT-IN), designated 217 in FIG. 2B, extracts the bit-clock timing and provides a bit-clock signal BC designated 218 which is distributed to the line switch circuitry of FIG. 2 and to the line circuitry of FIG. 14.

The framing circuit 221 of FIG. 2C receives this bit clock signal and the T1-DI signals and derives a framing clock signal FC which it supplies over lead 222 to the clock decoding circuit 224. This framing clock signal comprises a pulse for every 386th bit received over the T1 line. The clock decoding circuit 224 provides timing signals to the line switch. If framing is lost, the framing circuit detects the same and recovers framing.

The T1 INT-IN circuit 217 in FIG. 2B provides the bit-aligned signal to T1 INT-OUT circuit 210 thereby bit-aligning the T1-DO signals which are transmitted from the line switch circuit to the central office over path 102B. At the central office, framing circuit 344 in FIG. 3B supplies a framing clock signal designated FC 345 to decoding circuit 347 and to frame alignment circuit 343 every 386th bit position. If framing is lost, the framing circuit 344 detects the same and recovers framing. The frame alignment circuit 343 also provides bit- and frame-aligned signals to the digital switching matrix 373.

Communication connections between lines 101-0 and 101-N in FIGS. 2A and 2C comprise a first path for transmission from line 101-0 to 101-N; and a second path for transmission from line 101-N to 101-0. Assume, for example, that PCM channel 3 is assigned to line 101-0 and that PCM channel 17 is assigned to line 101-N. The first path may be traced from line 101-0 in FIG. 2A through the coder of line circuit 201-0, LC-DO 202-0, data selector 204, LC-DO 205, data selector 206 in FIG. 2B, path 207, data selector 208, T1-DO 209, T1

INT-OUT 210, path 211, STE 212, path 102B of T1 line 102 in channel 3, STE 339 in FIG. 3B, path 340, T1 INT-IN 341, T1-DI 342, frame alignment circuit 343, path 304, into the digital switching matrix 373 in channel 3, out of matrix 373 in channel 17 by means of time slot interchanging, thence through path 303 in FIG. 3A, data selector 329, path 330, data selector 331, path 332, data selector 333, T1-DO 334, T1 INT-OUT 335, path 336, STE 337, path 102A of T1 Line 102 in time slot 17, STE 215 in FIG. 2B, path 216, T1 INT-IN 217, T1-DI 219, and through the decoder of line circuit 201-N in FIG. 2C to line 101-N.

The second path may be traced from line 101-N in FIG. 2C, through the coder of line circuit 101-N, path 202-N to data selector 204 of FIG. 2A, LC-DO 205 to data selector 206 of FIG. 2B, path 207, data selector 208, T1-DO 209, T1 INT-OUT 210, path 211, STE 212, over path 102B of T1 line 102 in channel 17 to STE 339 in FIG. 3B, path 340, T1 INT-IN 341, T1-DI 342, from alignment circuit 343, path 304, into the digital switching matrix 373 in channel 17, out of 373 in channel 3 by means of time slot interchanging, thence to data selector 329 of FIG. 3A via path 303, path 330, data selector 331, path 332, data selector 333, T1-DO 334, T1 INT-OUT 335, path 336, STE 337, path 102A of T1 line 102 in time slot 3, STE 215 in FIG. 2B, path 216, T1 INT-IN 217, T1-DI 219, and through the decoder of line circuit 201-0 in FIG. 2A to line 101-0.

On a call between two different line switches through the digital switching matrix 373, the same channel number could be assigned (however, on different T1 line), if available, to the two line circuits. The looping back of T1-DI signals in FIG. 2B from path 219 through data selectors 206 and 208 to the data-out path T1-DO designated 209 allows signals from the central office to arrive at other line switches which may be on the same T1 line, and also allows certain signals from the central office to loop back thereto.

Within the line switch LS of FIG. 2, idle speech channels are simply switched from the T1 DATA-IN (T1-DI) to T1 DATA-OUT (T1-DO) via data selectors 206 and 208 of FIG. 2B. This allows the information in these channels to be passed through this line switch to other line switches on the T1 line if more than one line switch is included in the T1 line loop. Also, common-channel commands received by this line switch are forwarded on the T1 line in case the command is directed to another line switch on the T1 line. Normally, during the common-channel signaling bit position, the common-channel command bit is directly forwarded from the T1-DI (DATA-IN) to the T1-DO (DATA-OUT) via the data selectors 206 and 208. However, while the common channel sender for this line switch is sending a command, the data selector (208 in FIG. 2B) selects the common-channel sender during the common-channel bit positions. If the common-channel receiver receives a command during the time while the command is being sent, the line switch controller LS CTR of FIG. 2A stores this command. The LS CTR can then effect retransmission of this command on the T1 line after it has completed sending the previous command. Thus, the received command is stored and forwarded.

For assigned channels in the line switch LS, a channel strobe pulse for the duration of the channel time is sent to the line circuit LC over the enable path assigned to the channel, such as 220-0 in FIG. 2A. The selected LC then receives the 8-bit encoded speech sample during this channel. This 8-bit sample is supplied to the decoder portion of the codec in the LC. During this same channel time, the 8-bit speech sample from the coder is supplied on the LC-DO line to the T1 line via the data selectors. Thus, for assigned channels, the 8-bit speech sample from the coder is substituted from the line onto the T1 line for the 8-bit speech sample sent to the decoder on the line circuit LC. The circuitry also provides information to the LC over paths LSBC (226) and ABS (227) in FIG. 2C, identifying the occurrence of D2 signaling bit positions. This notifies the line circuit whether or not the insert and extract D2 signaling information from the least significant bit of the speech sample during its channel time.

DETAILED DESCRIPTION

Data Selector 206

As shown in FIG. 2A, NAND gate 238 has three inputs. With the first input B/I 237 indicating "BUSY", i.e., indicating that the line switch channel has been assigned a line, the second input 280 indicating "not 193rd bit", and the third input MB 233 indicating normal mode, the output of gate 238 on path 239 via decoder 220 allows the line circuit to be enabled and conditions the data selector 206 of FIG. 2B to allow information on the LC-DO path 205 to pass through data selector 206 to path 207. Any other combination of input signals to gate 238 will disable the line circuit and will condition data selector 206 to allow information on the T1-DI path 219 from the T1 line to pass through data selector 206 to path 207.

Data Selector 208

For nearly all bit positions, data selector 208 in FIG. 2B will allow information on path 207 to pass through to the T1 line. The exception is that, in the normal mode, in alternate 193rd bit positions, the LS CRT 231 (FIG. 2A) will, by means of signals on paths DO 244, CC-WE 243, and SEND-WE 241, as occasion demands, cause the common-channel send/receiver circuit 247 (FIG. 2B) via gate 251 and enable path 252, to condition data selector 208 so as to pass a common-channel signaling bit over path CCD to the T1 line. It should be observed that all bits on the T1 line entering a line switch or the central office enter the associated framing circuit. Following is a more detailed description relative to the bit patterns over the T1 line.

COMBINED FRAME SYNC. AND A, B IDENTIFICATION REPEATING PATTERN 000111

The clock decoding circuit 319 (see FIGS. 3A, 9, and 12) receives bit clock signals, shown in waveform J, FIG. 12, over path BC 301 and clock signals indicating the 193rd bit position shown as waveform A over path 193 BC 302. As a result thereof, circuit 319 projects signals shown in waveform E, FIG. 12, over path ABS 321 and signals shown in waveform C over path FC 320 during the 193rd bit time of even frames to data selector 333. As a result thereof, data selector 333 projects onto the T1 line electrical low and high signals which comprise the repeating logic pattern 000111 shown in waveform B, FIG. 12, in bit position 193 of even frames. This has the two-fold purpose of: (a) framing synchronization and (b) sixth and twelfth frame identification by the 01 and 10 transitions, respectively. This pattern, as seen in waveform A, and FIG. 2C, is transmitted over the T1 line to the line switch and enters the framing circuit 221 and the clock decoding circuit 224, thereby enabling circuit 224 to project signals as shown in waveform E over path ABS 227, in response to the 01 and 10 transitions, to distinguish between D2A and D2B signaling channels and the least significant bit clock LSBC, described hereinafter. The repeating pattern 000111 on the T1-DI path 219 is extended over data selectors 206 and 208 of FIG. 2B back onto the T1 line and, via other line switches which might be on the same T1 line, back to the central office. At the central office, as seen from FIG. 3B, the signaling pattern enters the framing circuit 334 and the clock decoding circuit 347, enabling 347 to project signals as shown in waveform E over path ABS 348. In other line switches which might be on the T1 line, signaling pattern 000111 accomplishes the same ends as described for line switch 101 of FIGS. 2A, 2B, and 2C. In case of loss of framing synchronization, the framing circuits detect the loss and effect reframing.

COMMON CHANNEL BITS

At the central office, common-channel signaling is initiated by the controller CO-CTR in FIG. 3A which writes a common channel command (a byte at a time) to be sent into the common-channel sender circuit 327. Circuit 327 inserts this command, composed of 8-bit multiple bytes, one bit at a time, onto the T1 line during common-channel bit positions. When no common channel command is being sent, a synchronization byte, comprised of the logic pattern 10111000, is continuously sent in the common channel. This allows the receiving end to synchronize on this synchronization byte. The start of a command is indicated by a non-synchronization code. A common channel command is terminated by returning back to sending of synchronization bytes.

Controller CO-CTR 305 in FIG. 3A, by means of write-enable path 307 and data path 306 writes a byte to be sent into common-channel sender 327. Sender 327, as controlled by common-channel clock signals, shown in waveform D, FIG. 12, projects electrical signals over path CCC 324, via path CCD 328 and data selectors 331 and 333 onto the T1 line, comprising common-channel signaling bytes and synchronization pattern 10111000, as described above. These common-channel bits, sent over the T1 line to the line switch, enter framing circuit 221 (FIG. 2C) and the common-channel sender/receiver circuits 247 (FIG. 2B). Circuit 247 reports these signals to LS-CTR 231 (FIG. 2A) by means of Interrupt paths INT 246 and DI 245 and REC-WE 242. These bits are extended from T1-DI path 219 through data selectors 206 and 208 (FIG. 2B), back onto the T1 line and, via other line switches which may be on the same T1 line, back to the central office. At the central office, these common-channel bits enter framing circuit 344 and common-channel receiver 352 (FIG. 3B). Receiver 352 reports these signals to CO-CTR 305 by means of Interrupt path 314 and Data path 312.

Figure 13:
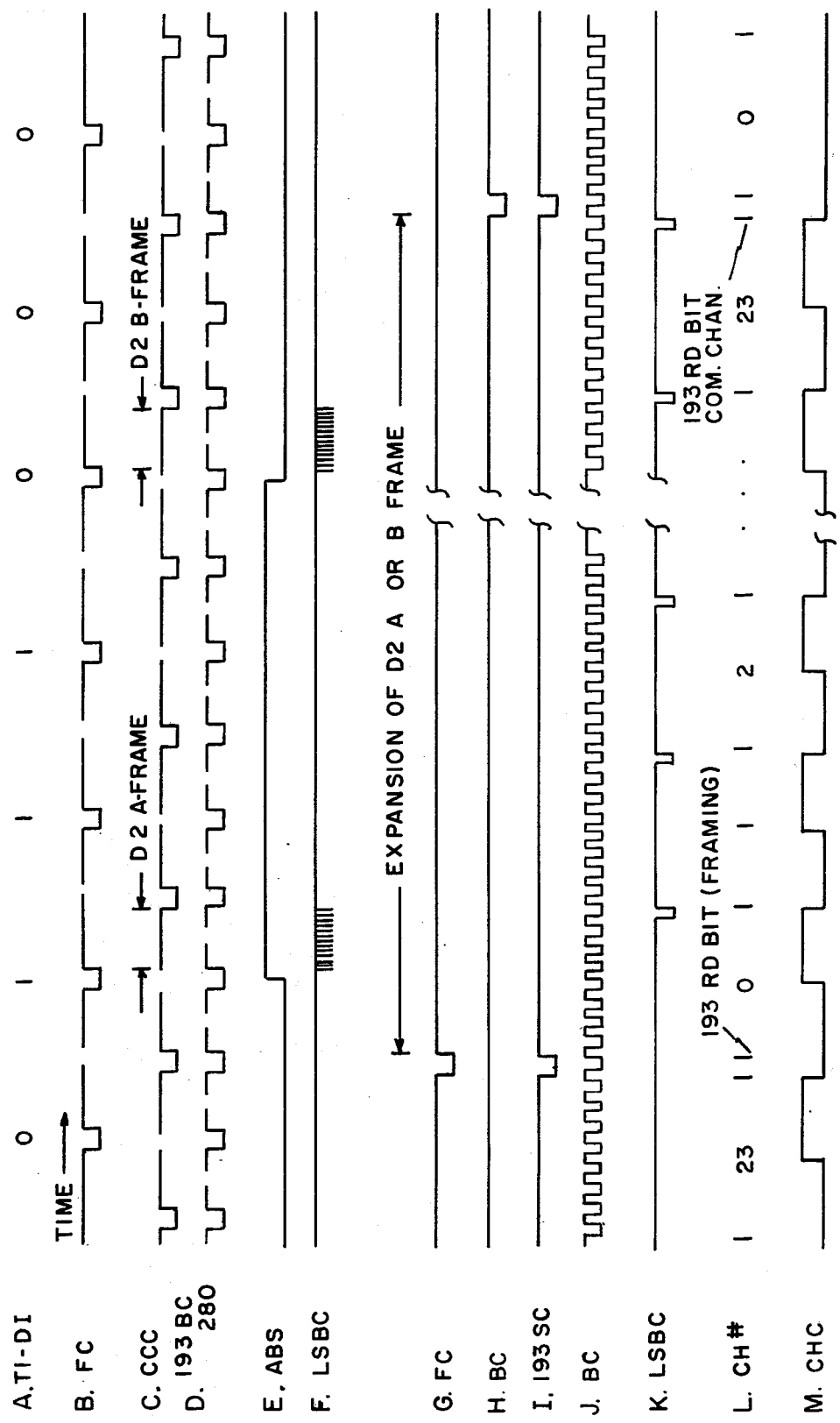
FIG. 13 depicts receiving circuitry waveforms, digital streams and channel designations at the line switch and digital central office. These are designated A - M and are likewise correlated with various components in FIGS. 2 and 3.

At the line switch, such as 101 in FIG. 1, common-channel signaling can only be initiated at such time as the synchronization code 10111000 is being received from the central office. Line switch controller LS-CTR 231 (FIG. 2A), by means of paths SEND-WE 241, CC-WE 243 and DO 244, conditions sender/receiver 247 (FIG. 2B), under control of clock signals CCC as shown in waveform C, FIG. 13, to control data selector 208 by means of paths CCS 249 and CCD 248. This enables transfer from path 207, through data selector 208, to path CCD 248 through data selector 208, thereby projecting common-channel signaling bits onto the T1 line. These signaling bits pass through other line switches which may be on the T1 line to the framing circuit 344 in FIG. 3B and to the common-channel receiver 352 in the central office under control of the CCC signals as illustrated in FIG. 13C. Receiver 352, via Interrupt path 314 and Data path 312 reports these signals received (a byte at a time) to CO-CTR 305. As previously stated, if the common-channel receiver within unit 247 (FIG. 2B) receives a command during the time that unit 247 is sending, LS-CTR 231 stores this command and forwards it after unit 247 finishes sending its command.

CHANNEL BITS — IDLE CHANNELS

During each idle channel of the 24 channels on the T1 line, the central office continuously projects the idle channel byte 01111111 onto the T1 line, except that during the sixth and twelfth frames, in accordance with the wellknown D2 signaling conversion, the central office continuously projects the idle channel byte 01111110. D2 signaling concepts are set forth in detail, for example, in "The Bell System Technical Journal," Vol. 51, No. 8, October, 1972, pages 1641-1766.

More specifically, for idle channels the processor writes into the digital switching matrix circuitry 373 of FIG. 3 to request that an idle code of 01111111 be sent during the idle channel. This involves writing into an outgoing control memory (not shown) to address a location in an outgoing auxiliary memory (not shown). The location in the outgoing auxiliary memory contains the idle code of 0 followed by seven 1's. This idle code is continually sent in the idle channel on lead 303 in FIG. 3A. This idle code arrives at one of the inputs on data selector 329 during the idle channel. The D2 least significant bit clock (LSBC) generated by clock decoding circuit 319 of FIG. 3A causes data selector 329 to select the other input, i.e., the DDD input during D2 bit positions for this channel. During these D2 bit positions, the D2 signaling sender 325 presents either A or B signaling bit to the input of data selector 329. Whether the A or B signaling bit is sent by the D2 signaling sender depends on the condition of the A/B select output lead ABS 321 of clock decoding circuit 319. During the idle condition of this channel, these A and B signaling bits in the D2 signaling sender both are 0. These bits in the sender, loaded to 0 by a request from processor PRO-371, are sent to the CO-CTR 305. The CO-CTR writes these bits to 0 by means of address bus 309, write-enable lead 310, and data bus 306. The D2 signal sender contains a total of 48 flip-flops for te A and B signaling bits for each of the 24 channels. At system initialization, the processor requests the CO-CTR 305 to write all 48 of these bits to 0. Then for idle channels, the data presented on T1-DO 334 contains the pattern 0 followed by seven 1's in all frames except the D2 signaling frames (sixth and twelfth frames). During these sixth and twelfth D2 signaling frames, the data projected on path T1-DO 334 for idle channels contain 0 followed by six 1's, followed by 0. Thus the D2 signaling bits indicate an on-hook or idle condition. For the idle channel, these 8 bits proceed to the line switch over the T1 line 102 and eventually are transmitted within the line switch to data selector 206 in FIG. 2B via lead 219. These idle channels are then switched through data selectors 206 and 208 back on the T1 line to the central office. The D2 signaling receiver 360 in FIG. 3B then receives the 0 in the A and B bits of the sixth and twelfth frames. The position of the sixth and twelfth frames is passed to the D2 signaling receiver 360 by framing circuit 344 in conjunction with a clock decoding circuit 347. These A and B bits are received and stored in memory in the D2 signaling receiver 360. These bits for the idle channel then indicate an on-hook or idle condition. The CO-CTR 305 continually scans the D2 A and B bits for the 24 channels (the 48 memory bits) in the D2 signaling receiver to detect changes. Whenever there is a change in any of these bits in the idle channel, CO-CTR 305 recognizes the change and performs hit filtering on the change. When a persisting change is detected, the CO-CTR 360 reports such change to the processor 371. On lead 304 (FIG. 3B) of idle channels entering back into the digital switching matrix, a pattern of 0 followed by seven 1's exists during all channels except during D2 signaling frames (sixth and twelfth frames). During these frames in the idle channel, a pattern exists of 0 followed by six 1's followed by 0. The information in idle channels on lead 304 simply stops at the input to the digital switching matrix and is ignored, since this channel has not been switched to any outlet on the matrix at this time. All of these idle channel bits enter the framing circuits at line switches and at the central office.

CHANNEL BITS — BUSY CHANNELS

Once the line number has been entered into the channel assignment memory 234 of FIG. 2A (described more fully hereinafter), this channel is no longer simply looped from T1 Data-IN 219 to T1 Data-OUT 209 in FIG. 2B. Instead, as shown in greater detail in FIG. 14, the T1 Data-IN is supplied to a decoder, such as 1433, and to D2 signaling flip-flops, such as 1427 and 1428 in the line circuit. Also, the T1 Data-OUT is supplied from a coder, such as 1406, as PCM bytes and the D2 signaling bits are supplied from control, such as 1410. Normally, the D2 signaling bits in both the A and the B bit positions simply indicate the switchhook status. Thus, following a line new seizure after the channel has been assigned in 234, the A and B bits change on the T1-DO 209 for this channel from 0, as they were in the looped condition, to 1's as they are bing supplied from control 1410. These bits are now 1 since the line is now off-hook. The PCM bytes and the 1's in the A and B bits pass over the T1 line to the central office. Since these D2 A, B bits ar now 1, they will be received in the A and B memory locations in 360 (FIG. 3B) corresponding to this channel. The CO-CTR 305, in scanning the D2 signaling bits in D2 signal receiver 360, will detect the change of state for these D2 signaling bits. The CO-CTR will report this change (to off-hook in this channel) to the processor. This is a verification that the line has been successfully assigned to the channel and is still off-hook. With the T1-DI path non-looped through data selector 206 in FIG. 2B (i.e., with the input-output path split), the central office CO-CTR 305, by means of paths ADDRESS 309, Write-Enable 310, and Data 306, conditions the D2 signaling sender 325 to forward control D2 A, B bits over the T1 line to the flip-flops 1427 and 1428 of the line circuit of FIG. 14 in setting up the call. These bits also enter the framing circuit 221 in FIG. 2C. After the call is set up, the bytes from the coder 1406 in the calling line circuit 201-0 pass through the digital switching matrix 373 and arrive at the decoder, such as 1433 of FIG. 14 in the called line circuit.

DESCRIPTIONS OF SPECIFIC CIRCUITS

Following are more detailed descriptions of certain specific circuits of the system, starting with the sending sections at the central office, progressing to receiving and sending circuits at the line switch, and concluding with the receiving section at the central office.

Figure 9:
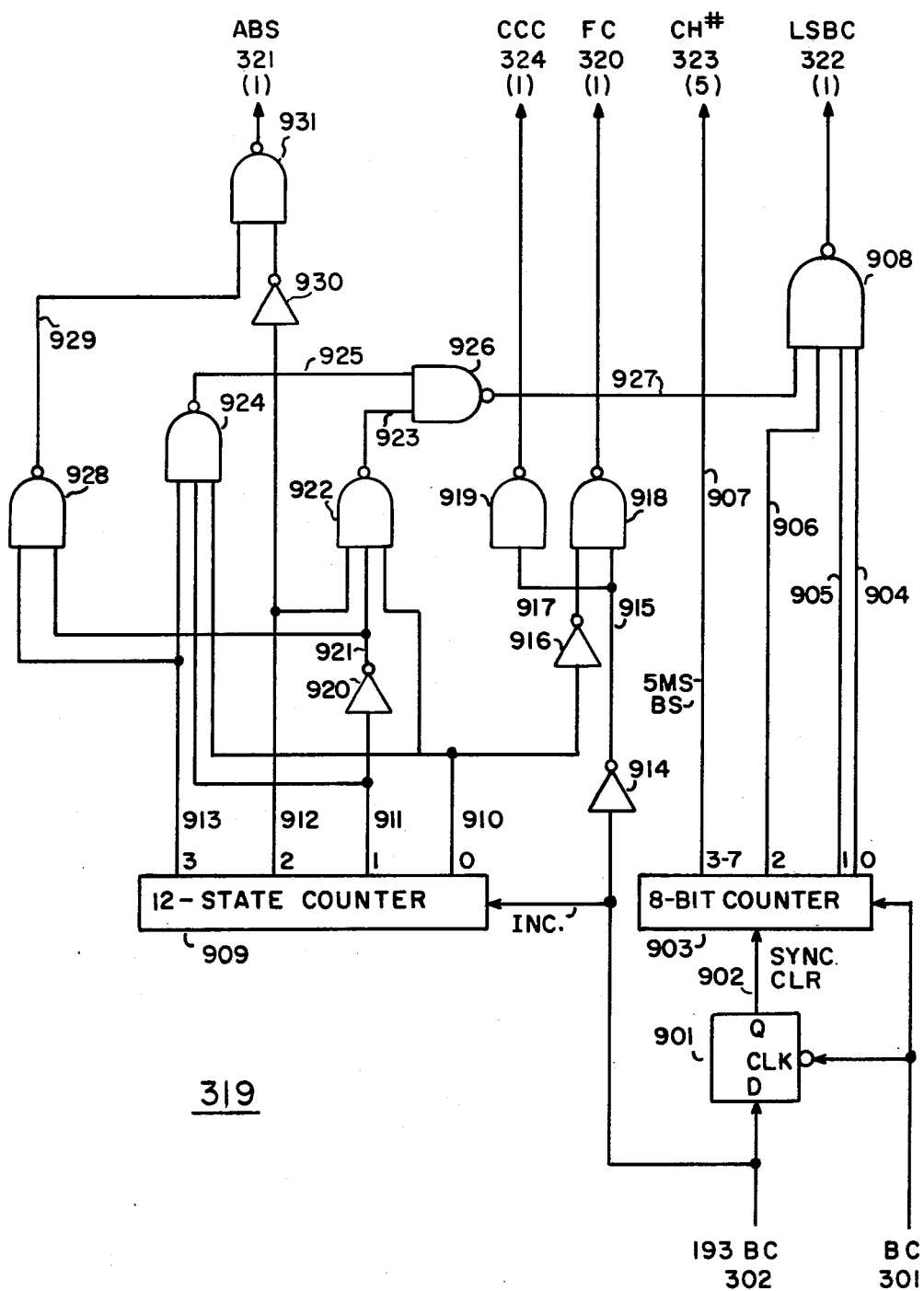
FIG. 9 is a diagram of a clock decoding circuit shown in FIG. 3A.

Clock Decoding Circuit 319 (FIG. 9)

The clock decoding circuit 319, associated with signaling sending in the central office circuits of FIG. 3A, is shown in detail in FIG. 9. The inputs to the clock decoding circuit 319 in the digital central office are 193 BC 302 (waveform A in FIG. 12) and BC 301 (waveform J in FIG. 12). The clock decoding circuit derives from these inputs the necessary clock pulses for inserting signaling information on the T1 line. These output clocks and signals are illustrated in the waveforms of FIG. 12 and described by the following:

1. Frame Clock Lead FC 320. (Waveforms C and H in FIG. 12)

The frame clock indicates the position of the framing bit position on the T1 line. This clock goes low every alternate 193rd bit position. Whenever this clock goes low, data selector 333 (FIG. 3) is switched to select the A/B select input ABS 321. This results in inserting the appropriate framing bit on the T1 line in the framing bit position. A repeating pattern of 000111 is inserted in this bit position.

2. A/B Select Lead ABS 321. (Waveform E in FIG. 12)

The A/B select lead identifies the position of D2 signaling A and B frames. This clock goes high for six frames and low for six frames. The second frame following a low to high transition of this signal is a D2 signaling A frame. The second frame following a high to low transition of this signal is a D2 B frame. The A/B select provides for insertion of the proper framing pattern on the T1 line. It is also used by the D2 signaling sender circuit 325 of FIG. 3A to identify whether A or B signaling bits are to be sent during a D2 signaling frame.

3. Common Channel Clock Lead CCC 324 (Waveforms D and I in FIG. 12)

The CC Clock identifies the bit position for providing the four-kilobit common channel. This clock goes low every alternate 193rd bit position between the framing bit position. Whenever the CC Clock goes low, data selector 331 of FIG. 3A is switched to select the output from CCD 328 in FIG. 3A. This provides for insertion of the next common-channel signaling bit onto the T1 line data stream. The CC Clock is also input to the common-channel sender 327 of FIG. 3A to indicate when the circuit should advance to the next common channel signaling bit.

4. Least Significant Bit Clock Lead LSBC 322. (Waveforms F and K of FIG. 12)

This clock goes low during the least significant bit position of each channel time, during either A or B signaling frame. Whenever this clock goes low, data selector 329 (FIG. 3A) selects the D2 signaling sender output DDD 326. This provides for insertion of the appropriate D2 signaling bit on the T1 line. This clock also indicates to the D2 signaling sender 325 when a D2 bit is to be sent.

5. Channel Number Path CH # (323). Waveform L in FIG. 12)

The path is comprised of five leads which indicate in binary form the channel number associated with the current PCM speech bits being sent on the T1 line. The decimal equivalent value of these five CH # bits is indicated in FIG. 12L. The CH # is used by the D2 signaling sender to identify the channel number during D2 signaling bit positions.

More specifically, the D flip-flop 901 in FIG. 9 is loaded at the center of each bit time. Thus, the output of this flip-flop is the 193rd bit clock delayed by one-half bit position. This output provides a synchronous clear to the 8-bit counter 903 via path 902. The 8-bit counter 903 is either incremented or cleared at the beginning of each bit time. The synchronous clear causes this counter to be cleared at the beginning of the bit position immediately following the 193rd bit position. The least significant three bits of this counter identify the current bit position being sent for a T1 line channel. A count of zero in the least significant three bits of this counter indicate that the most significant speech bit is currently being sent for the associated channel. A count of seven in these bits indicates that the least significant speech bit for the associated channel is currently being sent. The five most significant bits of the 8-bit counter indicate the current channel number for the channel being sent on the T1 line. These five bits indicate zero when the first channel is being sent and 23 when the 24th channel is being sent.

The 12-state counter shown in FIG. 9 is used in generating the frame clock over lead FC 320, common-channel clock over lead CCC 324, and the necessary signals for D2 signaling sending over lead ABS 321. This counter is incremented at the end of each 193rd bit position. The least significant bit of this counter is used for distinguishing between framing bit positions and common channel bit positions. Whenever this least significant bit is "O" at the start of a 193rd bit position, a frame clock pulse is generated. At the end of this bit position, the 12-state counter is incremented, thus making the least significant bit "L". Thus, at the next 193rd bit position, a common channel clock pulse is generated.

When the 12-state counter reaches a count of 5, the frame following is a D2 A signaling frame. When this counter reaches a count of 11, the frame following is a D2 B signaling frame. For either a count of 5 or 11 in the 12-state counter, an enable is provided for generating D2 LSB clocks. A NAND gate 908 combines this enable with all "1s" in the three least significant bits of the 8-bit counter to generate the D2 LSB clock over lead LSBC 322.

The other signal generated by the 12-state counter of FIG. 9 is the A/B select ABS 321. This signal is low when the 12-state counter is in states from 0 to 3. ABS 321 goes high for 12-state counter states from 4 to 9. ABS 321 goes low again for 12-state counter states of 10 and 11. Thus, this lead goes high for 6 frames and low for 6 frames.

Figure 11:
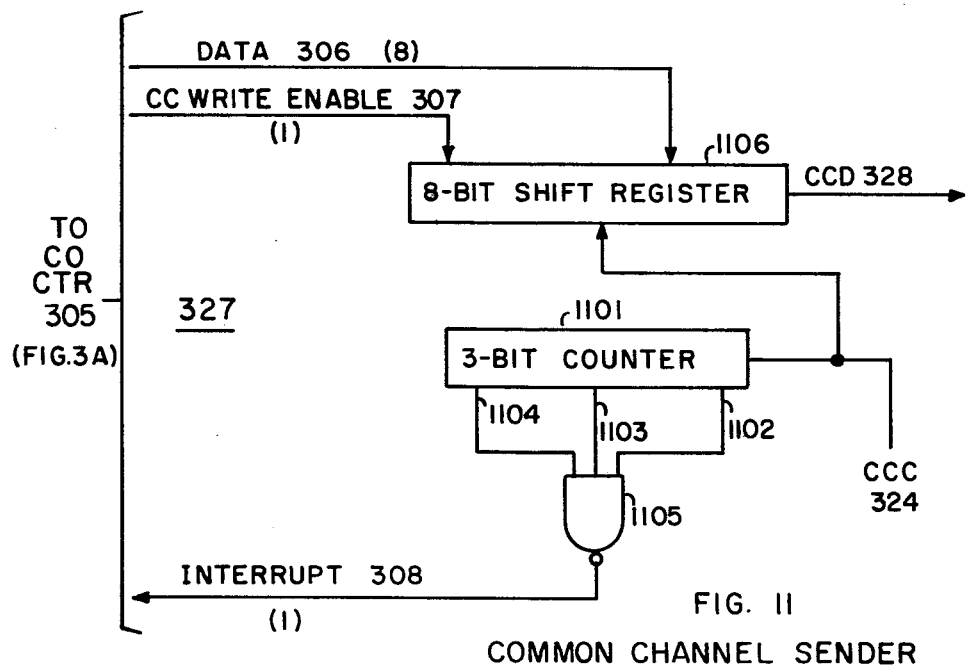
FIG. 11 is a diagram of a common-channel sender shown in FIG. 3A.

Common Channel Sender 327 (FIG. 11)

The controller CO-CTR 305 in the central office of FIG. 3A writes a common-channel command byte to be sent into the common channel sending circuit 327 by means of paths Data 306 and CC Write Enable 307. The common-channel sender simply inserts this command one bit at a time onto the T1 line data stream during common-channel bit positions. There are several possible formats for common-channel signaling using the four-kilobit channel.

Common-channel signaling commands are composed of 8-bit bytes. When no common-channel command is being sent, a synchronization byte composed of 10111000 is continuously sent in the common channel. This allows the receiving end to synchronize on this synchronization byte. The common-channel commands are composed of multiple bytes. The start of a command is indicated by a non-synchronization code. The information in a common-channel command generally includes the following:

1. Destination Address Information. (This identifies a particular line switch on the T1 line loop.)
2. Operation Code. This identifies the operation to be performed by this common-channel command.
3. Data Information.
4. Check Sum. The check sum indicates the sum of the previous bytes in the common channel command. This allows the receiving end to check for valid transmission of the command. If the check sum fails at the receiving end, the entire command is ignored.
5. Synchronization Code. A common-channel command is terminated by returning back to sending of synchronization codes. Synchronization codes continue to be sent until the start of the next common-channel command.

When the receiving end receives a common-channel command with a valid check sum, it sends a common-channel verify back to the sending end. This provides verification to the sending end of proper transmission of the common-channel command. The verify format is similar to the command format except that the operation code indicates a verify. If the command is of the type that can be rapidly executed by the receiving end, the verify can include data requested by the command. If the sending end does not receive a verify within 100 ms, a retransmission of the common-channel command is initiated. Generally, the retransmission occurs up to a total of three attempts to send the common-channel command. If the command is still unsuccessful, a fault condition is declared.

Referring to FIG. 11, a 3-bit counter 1101 is incremented at each common-channel bit position over path CCC 324. Whenever this counter reaches a count of 7 (or every 8th occurrence of the common-channel bit clock over lead CCC 324, an interrupt signal is generated and passed to CO-CTR over lead 308. This interrupt occurs every 2 ms (i.e., every 16 frames). At this interrupt, the controller CO-CTR fetches the next byte to be sent in the common-channel, provides a common-channel write-enable signal over path 307 to the 8-bit shift register 1106, and provides signals corresponding to the bits of this command byte in parallel to this register, storing the same. This is controlled also by clock signals over path CCC 324. If no common-channel bit position following the occurrence of the interrupt, the most significant bit of the common-channel byte in the shift register is being sent on the common-channel data out lead CCD 328. The shift register is then shifted at the end of the common-channel bit position in preparation for sending the next bit at the next occurrence of the common-channel clock. When the least significant bit of the common-channel command is being sent, another interrupt occurs to request CO-CTR to begin preparing for sending the next common-channel command byte.

Figure 10:
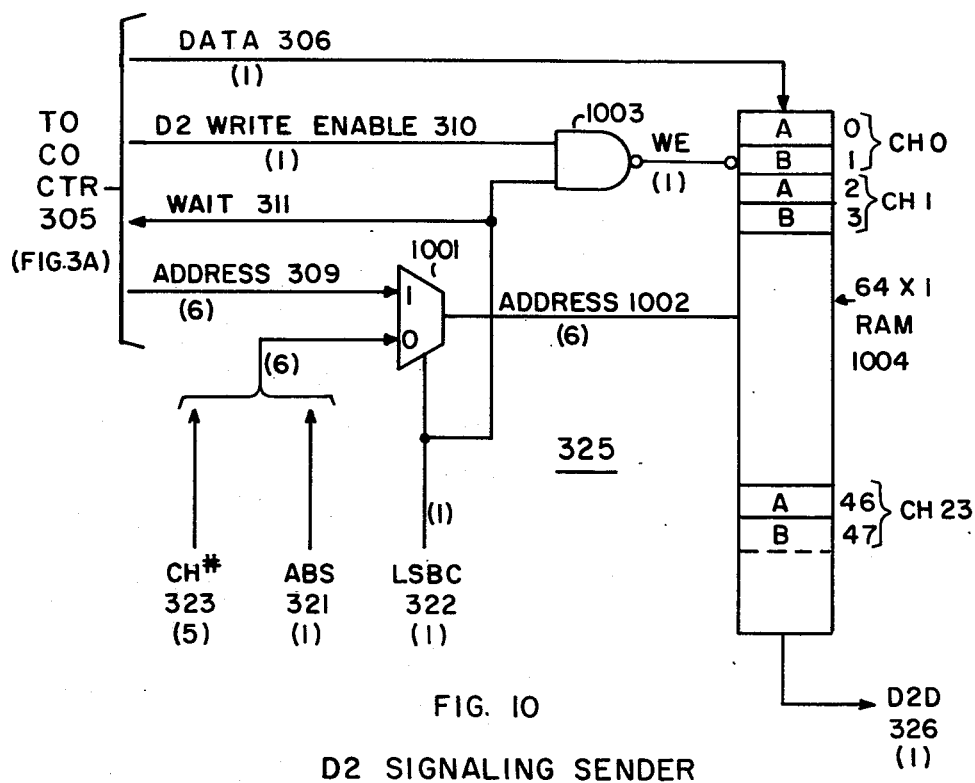
FIG. 10 is a diagram of a D2 signaling sender shown in FIG. 3A.

D2 Signaling Sender 325 (FIG. 10)

The CO-CTR in the central office of FIG. 3 operates by means of Data Path 306, Address Path 309 and D2 Write Enable 310, to write into the D2 signaling sender 325 the information to be sent in the D2 signaling A and B bit positions for each of the 24 channels on the T1 line via path DDD 326. Thus, there are a total of 48 signaling bits in the sender to be loaded by the CTR. This includes an A bit and a B bit for each of the 24 channels. The D2 signaling sender uses the CH # leads 323, along with the A/B select lead ABS 321 to identify which of these 48 signaling bits should be inserted at each D2 signaling bit position. The occurrence of a D2 signaling bit position is identified by the LSBC lead going low.

Referring now to FIG. 10, a 64×1 random access memory 1004 contains the D2 signaling bits to be sent on the T1 line. This memory contains an A bit and a B bit associated with each of the 24 channels. Thus, only the first 48 memory locations (locations 0 through 47) are used in this memory. Two consecutive address locations, such as locations 0 and 1 designated CH0 in FIG. 10, are used for each channel and respectively contain the A and B signaling bits for each channel.

During each D2 least significant bit position indicated over lead LSBC 322 the data selector 1001 selects the channel number leads CH # 323 and D2 A/B select leads ABS 321 to supply as the address leads 1002 to the memory 1004. This reads the appropriate D2 signaling bit from the memory to be sent on the D2 data out lead D2D 326 to the T1 line.

CO-CTR has the ability to write into any of the bit positions in the memory to change the D2 signaling bit associated with any channel. CO-CTR can write into this memory during any time except during D2 least significant bit positions. CO-CTR supplies the desired address to the RAM via six address leads 309, as indicated in FIG. 3. The value (0 or 1) to be written into the adressed bit is supplied on the data lead 306. A pulse on the D2 write enable-lead 310 causes the data to be written into the addressed bit position. If CO-CTR attempts to write into the memory during a D2 LSB bit position, the write-enable to the RAM via NAND gate 1003 is inhibited and a wait signal is supplied to CO-CTR via wait lead 311. CO-CTR then waits and completes and write operation after the wait signal has been removed.

T1 Interface-Out 335 (FIG. 3A)

The T1 Interface-Out circuit simply provides conventional unipolar to bipolar conversion to prepare the data for transmission on the T1 line. The span termination equipment STE further provides the necessary level changes for transmitting the information on the T1 line. Further details of the interface and span termination unit are not set out, since they are well-known in the art and not necessary for a description of the principles of the instant invention.

T1 Interface-In 217 (FIG. 2B)

The T1 Interface-In circuit 217 receives bipolar T1 line information from the receiving STE. The T1 Interface-In provides conventional bipolar to unipolar conversion of the T1 data input bit stream. The bit clock is also extracted by methods well-known in the art from the bit stream by this circuit and provided as BC-218 to the line switch including the T1 Interface-Out 210.

Framing Circuit 221 (FIG. 2C)

The framing used in the line switch is described in more detail in a later section of the specification. The inputs to the framing circuit are the T1 data stream and the bit clock. The outputs from the framing circuits are the frame clock over lead FC 222 and the out-of-frame indication mode bit over lead MB 223.

The framing clock output goes low during every framing bit position on the T1 line. This occurs every alternate 193rd bit position. This clock identifies the bit position carrying the pattern 000111000111. The mode bit over lead MB 223 indicates that the framing circuit is in the normal mode (in frame) or in the search mode (out of frame).

Clock Decoding Circuit (FIG. 4)

The same circuit is used in the line switch (designated 224 in FIG. 2C) and in the central office (designated 347 in FIG. 3B). The 193 BC output therefrom, however, is used in the line switch but not at the central office. The outputs from the framing circuit, along with the bit clock and T1-DI, are used as inputs to the clock decoding circuit. The outputs from the clock decoding circuit are described as follows with respect to the line switch circuit and, in general, have similar functions relative to the central office:

1. 193rd Bit Clock Lead (Waveforms D and I of FIG. 13)

The 193rd Bit Clock goes low during every 193rd bit position on the T1 line input data stream.

2. Common-Channel Clock Lead (Waveform C of FIG. 13)

The Common Channel Clock at path 225 of FIG. 2C goes low during common-channel signaling bit positions. These are the alternate 193rd bit positions between framing bit positions. The common-channel clock identifies to the common-channel sender/receiver 247 (FIG. 28) when to receive and send a common-channel signaling bit. Whenever this clock goes low and common-channel sending is taking place, data selector 208 (FIG. 28) is switched to select the output from the common-channel sender.

3. D2 Least Significant Bit Clock Lead — LSBC (Waveform F of FIG. 13)

The LSBC clock goes low at path 226 of FIG. 2C during the least significant bit position of each of the 24 speech chanels during D2 signaling frames. This clock identifies the bit position of D2 signaling bits on the T1 line. It is distributed to each line circuit, such as 201-0 (FIG. 14) in the line switch, and is used by the line circuit during its assigned channel (when its channel strobe signal is low). The LSBC clock indicates to the line circuit during its channel whether or not to perform D2 signaling extraction and insertion during the current bit position.

4. A/B Select Lead ABS (Waveform E in FIG. 13)

The A/B Select Lead is distributed via path ABS 227 of FIG. 2C to the line circuits. This information is used along with the LSBC clock by the line circuit assigned the current channel to determine during a D2 bit position whether an A or B bit is to be inserted and extracted. The A/B Select Lead is high during a D2 A signaling frame and low during a D2 B signaling frame.

5. Channel Clock Lead CHC (Lead 229 in FIG. 2C)

The Channel Clock changes from high to low at the end of each channel time (as illustrated by waveform M in FIG. 13) and from low to high at the center of each channel time. It is used by circuitry, including Register 236 in FIG. 2A, associated with assignment of a line circuit to a channel via channel assignment memory 234 of FIG. 2A.

6. Channel Number Path CH # (Waveform L of FIG. 13)

As shown in FIG. 2, the CH # path includes five leads which identify the number of the current channel being received on the T1 line. This information, represented by the waveform L of FIG. 13, is used by circuitry (including channel assignment memory 234 of FIG. 2A) associated with assigning a line to a channel. The CH # is used to sequentially address the channel assignment memory.

Referring now particularly to FIG. 4, in the provision of various signals, a counting arrangement is employed, comprising a 4-bit binary counter 411, a 4-bit 12-state counter 416, and two D flip-flops 418 and 420, which form a 386 state counter. The three least significant bits, designated 0, 1, and 2 of the four-bit binary counter 411, identify the bit position in a speech channel. Bit position two of this counter (which is low for bits 0-3 and high for bits 4-7 of a channel) can be used directly for the channel clock CHC. The most significant bit of four-bit binary counter, designated 3, along with the outputs from the 12-state counter, identify the channel number (CH #) directly. The 4-bit binary counter, along with the 12-state counter, provide for counting from 0 to 191 decimal. When the 12-state counter overflows (in progressing from a count of 191 to 192), the flip-flop 418 is set. This indicates a common channel signaling bit position. During this bit position, the flip-flop 418 is set and flip-flop 420 is cleared. This results in the common channel clock lead CCC going low. In the center of this bit time (at a count of 192), flip-flop 424 is set.

The flip-flop 424 provides a clear signal to the 12-state counter 416 and to the 4-bit binary counter 411 to hold these counters in the zero state at the occurrence of bit clock for progressing to a count of 193. The only change in progressing to a count of 193 is that the flip-flop 420 is set. When this flip-flop is set, the common channel clock goes back high. Also, in the center of the bit time at a count of 193, flip-flop 424 is cleared (since the D input is now "O"). This allows counters 411 and 416 to begin incrementing again, beginning at the bit clock to progress to state 194. For counts of 194 through 384, the flip-flops 418 and 420 remain in a state of 11. During these counts, counters 418 and 420 continue to increment from a count of 1 to 191 again. These counters are at a count of 191 when the overall counting has reached a count of 384. At a count of 384, the next bit clock pulse effects the clearing of counters 418 and 420 back to zero in progressing to a count of 385. At this time, an overflow progresses to the flip-flop 418 which clears this flip-flop. Flip-flop 420 is now set. The FC lead input goes low at a count of 385. A low on lead FC causes the flip-flop 424 to be set during the center of the bit position representing a count of 385. This causes the 12-state counter and binary counter 416 to be held cleared during the occurence of the bit clock for the next bit position. Also, the FC lead low causes the flip-flop 418 to be cleared to synchronize the counter to the FC clock. This causes the entire counter to be cleared at the occurence of the next bit clock (flip-flop 420 being cleared at this time) which returns the counting arrangement to a count of zero. When the FC lead goes high, flip-flop 424 is cleared in the center of the bit time for a count of zero. This allows the 12-state and binary counters to begin incrementing again at subsequent bit clocks. The entire clock decoding counter thus forms a 386 state counter, counting from a count of 0 to 384. A representation of the various count states is shown in FIG. 4A. This figure shows the logic values of various counters, flip-flops, and leads in the clock decoding counter circuit.

The circuitry for D2 clock extraction is shown at the right side of FIG. 4. This circuitry includes two D flip-flops and associated logic gates. The flip-flop 404 samples the T1 data input stream at the center of each framing bit position. Thus, flip-flop 404 samples the value of the D2 signaling identification pattern. The output of flip-flop 404 is the A/B select signal over path ABS.

Flip-flop 405 registers the current value of flip-flop 404 at the start of each common-channel bit position. In this manner, flip-flops 404 and 405 contain different values only during D2 signaling frames. Thus, the outputs from these flip-flops are Exclusive ORed via gate 407 to form a signal at the output of Exclusive OR gate 407 that indicates the presence of a D2 A or B frame on lead 408. The output of this Exclusive OR gate is ANDed with the least significant bit clock (lead 413) to form the D2 LSB CLK on lead LSBC.

When the framing circuit indicates an out-of-frame condition on the MB (mode bit) lead, this holds flip-flops 404 and 405 cleared to cut off the ABS and LSBC clocks during the out-of-frame condition.

Figure 6:
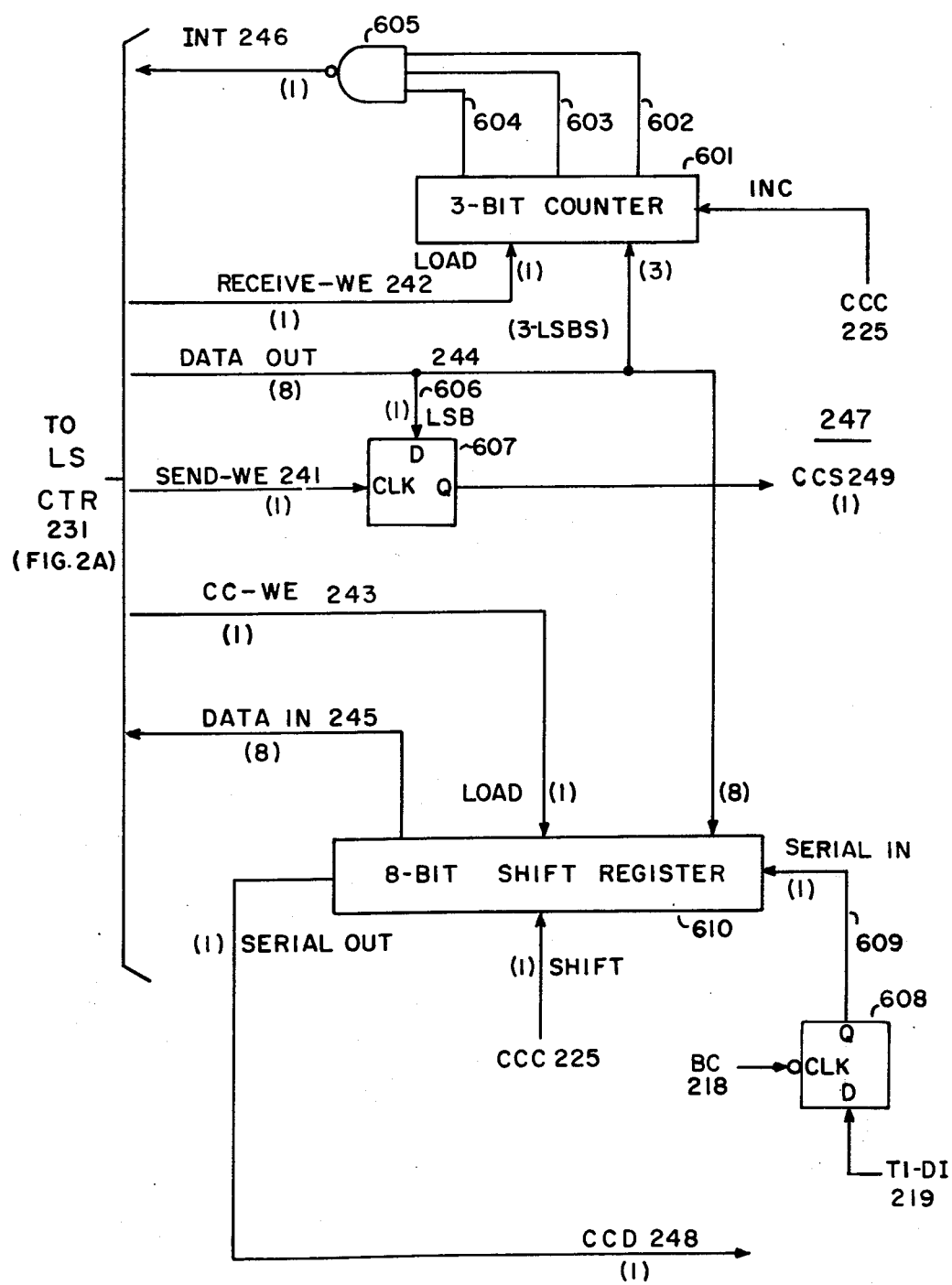
FIG. 6 is a diagram of a common-channel sender-receiver shown in FIG. 2B.

Common-Channel Sender-Receiver 247 (FIG. 2B & FIG. 6)

The common-channel sender-receiver 247 in the line switch of FIG. 2B provides the function of sending and receiving common-channel commands on the T1 line. A common-channel command bit is received during each bit time for which the common channel clock over lead CCC 225 is low. The common-channel bit at this time is received on the T1 Data-In path 219. When a common-channel command byte (8 bits) has been collected, the line switch controller LS CTR 231 (FIG. 2A) is interrupted over lead INT 246. The received common channel command byte is then read by LS CTR 231. A common-channel byte is received by the common-channel sender-receiver every 2 milliseconds. The LS CTR 231 ignores bytes that represent synchronization codes. When a non-synchronization code is received, LS CTR 231 saves this command byte, along with subsequent command bytes, until the next synchronization code is encountered. At this time, LS CTR 231 performs a check sum test on the command. If the check sum fails, the command is ignored. If the check sum passes, the command is interpreted. If the command is directed for this line switch, the command is executed. This includes taking action to send a verify on the common channel with the common-channel sender.

When no common-channel sending is taking place by this line switch, the common-channel command bits received by the line switch are immediately forwarded out of the T1 line. This forwarding takes place via data selectors 206 and 308 in FIG. 2B. This provides forwarding of common-channel commands to other line switches on the T1 loop (if any others exist on the loop).

Sending of a common-channel command by this line switch can be initiated only while synchronization codes are being received on the T1 line by this LS. Sending begins at the time of an interrupt to LS CTR from the common-channel sender-receiver 247. At this time the CC send lead CCS 249 is set high to initiate common-channel sending via AND gate 251. Also a common-channel byte to be sent is loaded into the common-channel sender-receiver 247 from LS-CTR 231 by means of leads DO 244 and CC-WE 243. When the CCS lead 249 is high, data selector 208 of FIG. 2B selects the lead CCD 248 during the common-channel bit time. The common-channel sender then outputs a common-channel bit at each occurrence of the CC clock over lead CCC 225. At subsequent interrupts, LS CTR 231 continues to load subsequent common-channel bytes into the common-channel sender. After the complete command or verify followed by a synchronization code has been sent, the CCS lead 249 is generally cleared to the low logic state.

If a common-channel command was received during the period of time while a common-channel command or verify was being sent, the received common-channel command is stored in LS CTR 231. After LS CTR 231 completes sending the command or verify, the received command can be forwarded on the T1 line by sending this received command in the same manner described above via the common-channel sender.

As is shown more specifically in FIG. 6, for common-channel receiving a D flip-flop 608 samples the T1 data in at the center of each bit position. The output of this flip-flop is only sampled at the end of each common-channel bit position. The common-channel clock signals over lead CCC 225 is used to shift this common-channel bit into an 8-bit shift register 610. During a period of 2 ms a complete common-channel command byte is collected in this shift register starting with the most significant bit of the common-channel command through the least significant bit.

A 3-bit counter 601 is incremented at the occurrence of each common-channel bit position over lead CCC 225. When this counter reaches a count of 7 (i.e., every 8th commmon-channel bit position), an interrupt signal is sent to the LS CTR over path 246. When this interrupt, which occurs every 2 ms or every 16 frames, is sent, LS CTR reads the 8-bit shift register via path 245 to read the common-channel command byte collected over the previous 2 ms. If the byte received is a synchronization code, it is ignored by LS CTR unless the previous byte received at the last interrupt was a non-sync code. If the previous byte was a non-sync code, this sync code marks the end of a common-channel command. In this case, LS CTR performs a check sum test on all the bytes received in the common-channel command.

If check sum fails, the command is ignored. If the check sum passes, LS CTR interprets and executes the command if it applies to this line switch. If the byte read from the 8-bit shift register at the time of an interrupt is a non-synchronization code, LS CTR simply collects the command byte in a hopper until the next sync code is received which marks the end of the command.

If LS CTR receives the same command byte repetitively (say five times in a row) LS CTR performs a resynchronization procedure. Repetitive receipt of the same byte indicates a likelihood that the interrupt is not occurring at the correct 1-of-8 common-channel bit positions. Thus the byte being repetitively read is probably a rotated version of the synchronization code. In this case, LS CTR can determine the number of bit positions that the byte being read is rotated from the correct sync code. From this, LS CTR can determine the proper value to load into the 3-bit counter 601 to obtain correct synchronization. LS CTR loads this value into the 3-bit counter 601 via DO 244 and REC WE 242.

At an interrupt, after the CTR has read the 8-bit shift register 610, LS CTR determines if any common-channel command sending is to take place. If no sending is to take place, no further action associated with sending is required by LS CTR. In this case, lead CCS-249 is low which causes the common-channel command bits received on the T1 line to be directly routed to the T1 line out. Common-channel command sending by LS CTR can only be initiated if a sync code has just been received. Then to begin sending the common-channel command, LS CTR loads the first byte of the command into the 8-bit shift register 610 via path 244. LS CTR also sets the D flip-flop 607 over lead Send WE 241 to set lead CCS 249 to logic 1. The command byte is then sent on the T1 line during the next eight common-channel bit positions. Common-channel bits received on the T1 line over path TI-DI 219 are shifted into shift register 610 as the common-channel bits being sent over path CCD 248 are shifted out of the 8-bit shift register. At each consecutive interrupt, the remaining bytes of the command being sent are loaded into the 8-bit shift register followed by a check sum and then synchronization code. At the interrupt following sending of the synchronization code, the CCS bit from flip-flop 607 is cleared unless another command is to be immediately sent or forwarded.

If any non-synchronization code is received on the T1 line while a common channel command is being sent, the common channel command bytes received must be forwarded on the T1 line in case they are directed to another line switch. Thus, after LS CTR has completed sending the current command followed by a sync code, LS CTR proceeds with sending the command bytes that were received. Thus, LS CTR stores and forwards command-channel commands that are received while it is in the process of sending a common-channel command.

LS CTR 231

LS CTR 231 in FIG. 2A collects, interprets, and executes common-channel commands. It also formats and initiates sending verifies following reception of the common-channel command. LS CTR 231 initiates sending common-channel command when necessary, such as following detection of a line new seizure or a fault condition. The framing circuit 221 of FIG. 2C indicates an out-of-frame condition to the LS CTR 231 by means of the mode bit from the framing circuit over lead MB 223. If this mode bit indicates the search mode, an out-of-frame condition exists. In this case, LS CTR 231 ignores common-channel commands until reframing has been achieved. Commands interpreted by LS CTR 231 include such functions as: assigning a subscriber line to a channel, releasing a subscriber line from a channel, requesting ringing to a line, requesting testing of a line, requesting coin control, requesting maintenance functions, and requesting a party test. LS CTR 231 performs the necessary functions to carry out these commands.

Channel Assignment Memory 234

The channel assignment memory 234 in FIG. 2A is used for assigning a subscriber line to a channel. This memory contains one word for each channel on the T1 line, for a total of 24 words. Each of these words contains a busy-idle (B/I) bit which indicates whether or not the associated channel is busy. Each word also contains a line number field. If the associated channel is busy, the line number field indicates the line employing the associated channel. The line switch can contain up to 320 lines. Thus the line number field is a 9-bit entry. The channel assignment memory is updated by LS CTR 231 in response to common-channel commands to assign a line to a channel or to release a line from a channel. The register 236 (FIG. 2A) associated with the channel assignment memory 234 over path designated LINE # 235 is loaded at the end of each channel time under control of the high-to-low transition of CHC 229 the channel clock lead from the clock decoding circuit 224 of FIG. 2C. The address being read from the channel assignment memory at this time is supplied by the channel number leads CH #228 from the clock decoding circuit 224. The register is loaded with the line number assigned to the next channel. Thus the address in the chanel assignment memory should be one less than the channel number to which the line is to be assigned. For example, to assign a line to channel number 5, the line number should be entered in address location 4 in the channel assignment memory. To assign a line to channel 0, the line number should be entered in address location 23 in the channel assignment memory.

The line number in register 236 is supplied to decoder 220 of FIG. 2A over path LINE # 240 which includes nine leads for nine bits. In actual implementation this decoder decodes 9 bits to select one of 320 line circuits during a busy channel. Since this decoder is quite large, it is actually constructed in several stages, but for simplicity it is shown as one block. This decoder is enabled during the 8 speech bits for all busy channels and is disabled during the 193rd bit position on the T1 line. The decoder when enabled provides a logic 0 on a channel strobe lead of the group 220-0 to 220-N to the line circuit assigned to the line circuit assigned to the current channel. This enables the selected line circuit to send and receive encoded speech bits to and from the associated T1 line, it being observed that the path 240 from the register 236 also controls the data selector 204. In actual implementation, here would be two T1 lines connected to each line switch. Thus all of the circuitry shown in FIG. 2 for the LS would be duplicated. Separate busing would be supplied from the circuitry for the other T1 line to all line circuits.

D2 Receiving and Sending at the Line Switch

Figure 14:
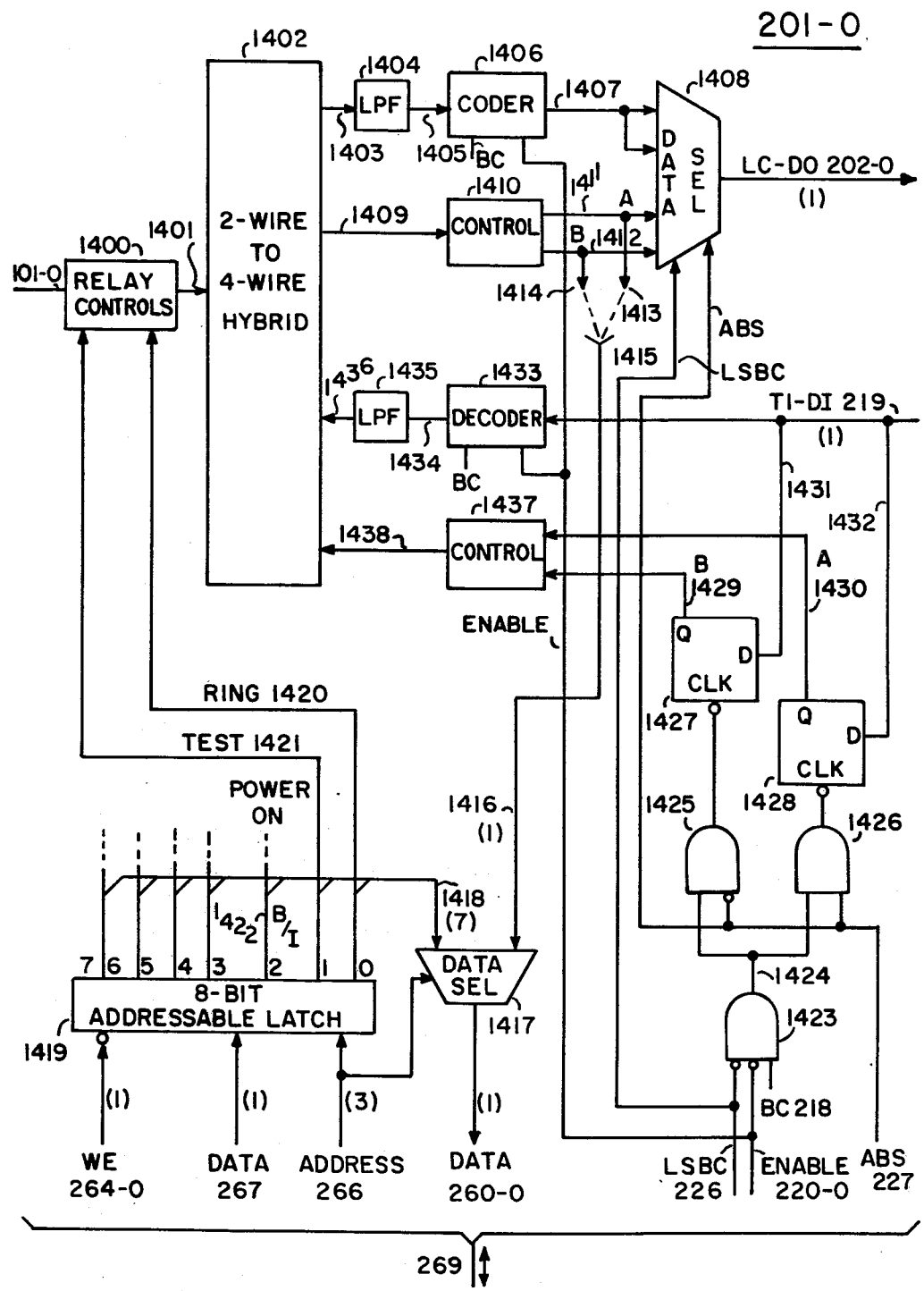
FIG. 14 is a diagram of certain features of a line circuit incorporated in the line switch of FIGS. 2 and 3.

D2 signaling sending and receiving at the line switch is performed by the line circuits (See FIG. 14). As mentioned earlier, the channel strobe lead designated ENABLE to a line switch goes low for 8 bit times during its assigned channel. While the channel strobe (ENABLE) lead is low, the line circuit normally receives 8 speech bits over the T1-DI lead 219 of FIG. 2A and simultaneously outputs 8 speech bits on the LC-DO lead such as 202-0 of FIG. 2A. Data selector 204 shown in FIG. 2A selects the proper line circuit codec output for returning the speech data to the T1 line-out. The D2 LSB clock over lead LSBC 226 from the clock decoding circuit 224 in FIG. 2C goes low during the least significant bit time of all 24 channels during D2 signaling frames. This clock is supplied to all line circuits as indicated by the multiple sign in FIG. 2C. For the line circuit assigned the current channel (that is, when the channel strobe (ENABLE) lead is low), a low on the D2 LSB clock indicates that the current bit position is the D2 signaling bit. The D2 A/B select lead designated ABS 227, also multipled to all line circuits, indicates whether this bit is an A signaling bit or a B signaling bit. During this bit position, D2 signaling information is suplied on the line circuit LC-DO lead such as 220-0 from the line circuit rather than the least significant bit from the speech coder. For certain line circuits, for example those connected to standard telephone sets, the D2 signaling information supplied during this bit position is simply the output from the switchhook detector circuit of the line circuit. This indicates the "switchhook" on-hook, off-hook status found in the control 1410 in FIG. 14. This switchhook status information is supplied independent of whether this is an A or B signaling frame, i.e., in both bits.

For line-circuit conditions in which it is necessary to make a distinction between A and B signaling information, the D2 A/B select lead ABS 227 identifies whether this is an A or B signaling bit. In such situations, this lead can select whether to insert the A or B signaling information during a D2 signaling bit position for the line circuit assigned to the current channel. For example, on a line circuit for PBX applications, one of the signaling bits indicates loop closure and the other signaling bit indicates ground start.

For line circuits connected to standard telephone sets, D2 signaling information is not received by the line circuit. For line circuits connected to instruments or input circuits requiring D2 signaling information from the central office, the D2 signaling information would be received on the T1-DI lead 219 to the line circuit during a D2 signaling bit position for the line circuit assigned to the current channel. During the D2 signaling bit positions, i.e., with paths LSBC and Enable energized in FIG. 14 the information on the line circuit T1-DI lead is loaded into D2 signaling receive flip-flops 1427 and 1428 as apropriate. This occurs during a least significant speech bit position during every 6th frame. On these special line circuits, if a distinction is to be made between A and B signaling bits, the D2 A/B select lead ABS 227 can be used to indicate whether the D2 signaling bits received on the T1-DI lead should be latched in an A or B signaling receive flip-flop 1427 or 1428, respectively, of the line circuit.

T1 Interface-Out 210 (FIG. 2B)

T1 Interface-Out 210 provides unipolar to bipolar conversion to prepare data to be sent out on the T1 line from the line switch via the span termination equipment STE 212. The bit clock lead BC 218 from T1 INT 217 provides a bit clock for aligning bits out from T1 INT OUT 210.

T1 Interface-In 341 (FIG. 3B)

T1 Interface-In 341 provides bipolar conversion of the information received from the incoming span termination equipment STE 339 and also provides bit aignment of the incoming T1 line data stream with the central office bit clock over lead BC 301.

Framing Circuit 344 (FIG. 3B)

The inputs to framing circuit 344 are the T1 data-input stream T1-DI and the central office bit clock BC 345. The outputs from the framing circuit are the frame clock (FIG. 13B) over path FC 345 and the mode bit over path MB 346. The mode bit provides a normal mode or search mode indication (out-of-frame indication). The out-of-frame indication notifies CO CTR 305 to ignore signaling information during a out-of-frame condition.

Frame Alignment Circuit 343 (FIG. 3B)

Frame alignment circuit 343 provides a delay of the T1 data-input stream to align it with the 193rd bit clock of the central office. This is accomplished with an elastic store in the frame alignment circuit. The inputs to the frame alignment circuit are the frame clock from the framing circuit over path FC 345, the bit-aligned T1 data-input stream over path T1-DI, the bit clock over path BC 301, and the 193rd bit clock over path 193 BC 302 associated with the central office. The frame clock from framing circuit 344 is generally not aligned with the 193rd bit clock of the central office. The frame alignment circuit delays the incoming bit steam until the framing bit position is aligned with the 193rd bit clock of the central office. The output from the frame alignment circuit is the frame-aligned T1 data input stream at path 304.

Figure 8:
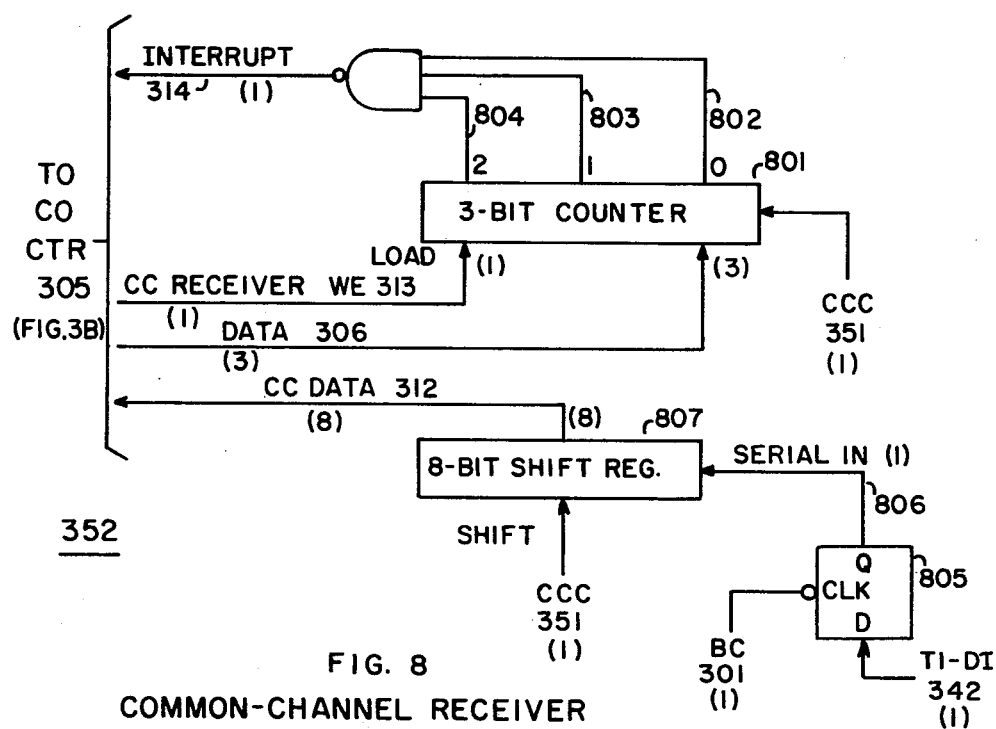
FIG. 8 is a diagram of a common-channel receiver shown in FIG. 3B.

Common-Channel Receiver 352 (FIG. 8)

Common-channel receiver circuit 352 receives a common-channel bit during bit positions when the common channel clock over lead 351 is low. The common-channel bit is received from the T1 data-input information over path T1-DI 342. The receiver performs common-channel byte alignment by detecting synchronization codes. Non-synchronization codes and the first synchronization code immediately following a command which is used to terminate a command are collected, a byte at a time, in the common-channel receiver. These common-channel command bytes can then be read and collected by the CO CTR 305. The collected common channel commands are interpreted and executed by a higher level of control, i.e., by PRO 370 in FIG. 2. This circuit functions similarly to the receiving portion of the common-channel receiver-sender at the line switch. Common-channel commands are collected in a similar manner. Also resynchronization is performed in the same manner as in the line switch if it is determined that synchronization is lost. CO-CTR 305 contains a microprocessor which is used for controlling the sending and receiving functions for signaling on the T1 line and can be shared over several T1 lines if real time is sufficient.

Figure 7:
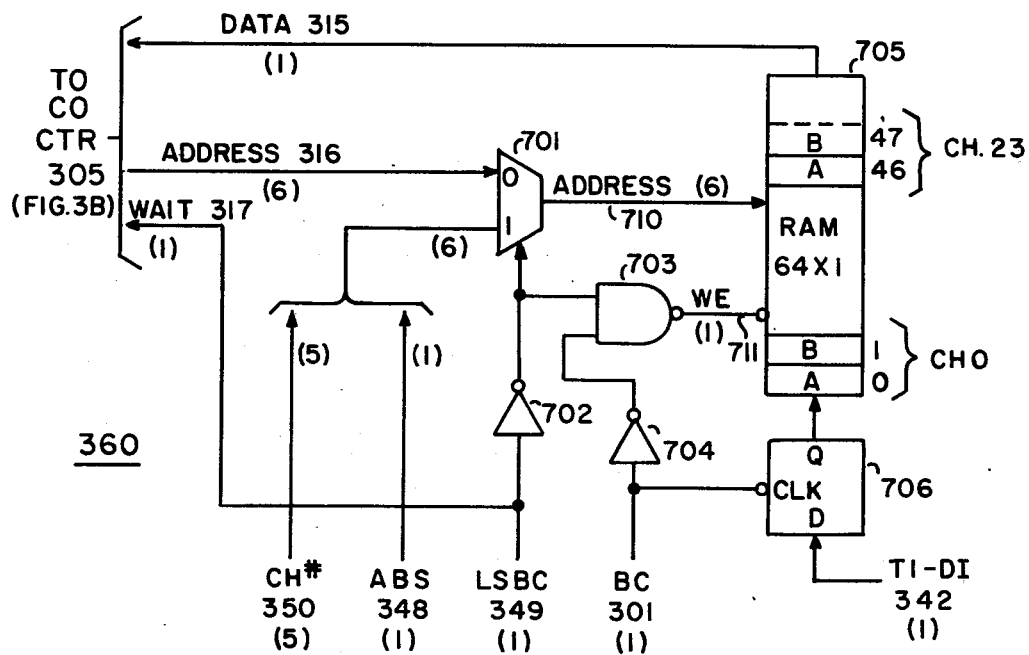
FIG. 7 is a diagram of a D2 signaling receiver showin in FIG. 3B.

D2 Signaling Receiver 360 (FIG. 7)

D2 signaling receiver 360 collects and stores the D2 A and B signaling bits associated with each of the 24 T1 line channels. Thus it stores a total of 48 D2 signaling bits. The presence of a D2 signaling bit is indicated by the LSBC clock over lead 349. The channel number at this time is indicated by the chanel number leads in CH # path 350. Whether this is an A or B signaling bit is indicted by the D2 A/B select lead ABS 348. This lead along with the CH # leads indicates to which of the 48 storage bits the current D2 signaling bit should be stored in the D2 signaling receiver. The D2 signaling bit is received on the T1 data input stream over path T1-DI. CO CTR 305 periodically reads the state of each of these 48 D2 signaling bits.

More specifically, the D2 signaling bits received on the T1 line are written into the 64 ×1 RAM designated 705 in FIG. 7. The format for writing the bits into this RAM is identical to that used for the D2 signaling sender. The T1 input data is sampled in the center of each bit position by D flip-flop 706. The output of this D flip-flop supplies the D2 signaling A or B bit to the data input lead to the RAM during the D2 signaling bit position. Durig D2 signaling bit positions, the proper address is supplied by data selector 701 to the RAM 705 over path 710 from the channel number over path CH # 350 and D2/A-B select over lead ABS-348 from the clock decoding circuit. A write enable is applied to the RAM over path 711 during the second half of the D2 signaling bit position. This causes the signaling bit to be written in the appropriate location of the RAM. CO CTR 305 can read any signaling bit from the RAM at any time except during D2 signaling bit positions. CO CTR 305 supplies the address of the RAM bit to be read on six address leads over path 316. The bit read from the RAM is supplied back to CO CTR 305 on the D2 DATA lead 315. If CO CTR 305 attempts to read the RAM during a D2 signaling bit position, a WAIT signal over path 317 is supplied to CO CTR 305 by lead LSBC 349. CO CTR 305 then delays until the wait signal is removed before completing the read operation. CO CTR 305 can then periodically scan the 48 signaling bits in the RAM. CO CTR 305 can also monitor for changes of state in any of the signaling bits and perform hit filtering on these changes of state. If a state change is detected and persists for the hit filtering duration, CO CTR 305 reports the change to a higher level of control in the central office, i.e., to PRO 371.

Referring again to FIG. 3 it will be appreciated by those skilled in the art that PRO 371 may connect to a plurality of CO CTRs for cooperating with a plurality of T1 lines; and that the Digital Switching Matrix can accommodate a plurality of T1 lines.

Line Circuit 201-0 (FIGS. 2, 3 and 14)

Up to eight status bits on a line circuit, such as 201-0 in FIG. 2A, can be written into and read by the line switch controller LS CTR 231, which may be a microprocessor. For addressing these status bits, LS CTR 231 supplies the line number address over path 268 on lead 262 and the bit number address on lead 266.

For writing into a status bit, decoder 264 in FIG. 2A selects the appropriate line circuit over a write enable lead such as WE 264-0. LS CTR 231 supplies the data to be written into the status bit over DATA lead 267. When the data and address over paths 262 and 266 has settled, LS CTR 231 supplies a negative-going pulse on the write enable lead WE 265. This supplies a write enable over path such as WE 264-0 to the selected line circuit which writes the data bit on lead 267 into the selected status bit of an 8-bit addressable latch 1419, shown in FIG. 14. The three-bit address bus 266 to the line card selects one of the status bits in addressable latch 1419.

For reading status bits, LS CTR 231 also supplies the address of the status bit to be read over leads 262 and 266 in FIG. 2A. The selected status bit addressed via leads 266 is addressed on all line circuits as indicated by the multiple sign in FIG. 2A. The selected status bit then is presented on the output of a data selector 1417 (FIG. 14) to leads such as 260-0. The appropriate line that is being read is then selected by data selector 260 (FIG. 2A) to present the selected status bit to LS CTR 231 over lead 261. Thus LS CTR 231 can directly write or read any status bit with write and read instructions. One of the status bits that can be read by LS CTR 231 is the signal for detecting a new seizure. The new seizure signal is read via lead 1416 in the line circuit of FIG. 14. Normally, this new seizure signal is a loop closure for standard type line cards for connection to regular telephone sets, for example. In certain special types of line cards such as for PBX lines, the new seizure signal alternatively could be a ground start.

The remaining seven status bits that are readable by LS CTR 231 are status bits from the addressable latch 1419 which are also writable from LS CTR 231. These status bits may include, for example, a status bit for operating a ring relay, for operating a test relay, and for busy idle (B/I) information.

For detecting line new seizures, LS CTR 231 continuously scans the new seizure lead 1416. For scanning a particular line circuit, LS CTR places the address of the line circuit on path 262 and the address of the "switchhook" detector status bit on path 266. If this status bit indicates an off-hook, LS CTR 231 must then further check the busy/idle (B/I) status bit to determine if this is a new seizure. To do this, the line switch controller 231 places the same line address on leads 262 to data selector 260 and the bit address of the B/I status bit on leads 266. This causes the line switch controller to read the B/I status bit. If this is a new seizure, the B/I status bit indicates an idle condition. In this case the line is off-hook and idle. If this is not a new seizure, the B/I status bit indicates a busy condition. This indicates that the associated line is off-hook and busy which is a line already in conversation or one for which the new seizure has already been detected.

When a new seizure is detected by LS CTR 231, it sets the B/I bit for this line. This is performed by writing a 1 into this status bit by presenting data over lead 267 (setting this lead to 1). A line address and status bit address are placed over leads 262 and 266 and the write enable to 265 and via decoder 264 to lead 264-0 is enabled, after the other signals have settled, to perform writing into the B/I bit. The LS CTR 231 then proceeds to send a new seizure common-channel command via the common-channel sender in 247 of FIG. 2B. This common-channel command, including the line number identity of the line with a new seizure, is outpulsed by 247, and is received by common-channel receiver 352 (FIG. 3B). The central office, upon receiving the common-channel command, interprets the command. This command interpretation is mainly performed by a higher level of control (such as PRO 371) than by CO CTR 231. The central office seizes an idle channel on the associated T1 line and then formats a common-channel command verify to be sent on the T1 line for assigning the associated line to this seized T1 line idle chanel. This common-channel command verify is presented to CO CTR 231 which, in conjunction with the common-channel sender 327, sends the channel assignment/common-channel verify to the line switch. This common-channel verify is received by circuit 247 in conjunction with LS CTR 231. When LS CTR 231 receives the entire command, it interprets and executes this channel-assignment verify command, effecting the assignment of the line number in the address of the channel in the channel assignment memory 234. The B/I bit in the channel assignment memory corresponding to this channel is also set by LS CTR 231. At this time, the line circuit is assigned to the associated channel. The eight speech bits from the coder 1406 (FIG. 14) are then presented via data selector 1408 (FIG. 14) to LC-DO path 202-0 and eventually to T1-DO during its channel time. Once this PCM speech path has been established, dial tone can be returned from the digital switching matrix 373 in the central office on the assigned channel to the subscriber.

Also, during the least significant bit in 6th and 12th frames, D2 signaling bits can be inserted in the least significant speech bit position instead of the output from the coder by data selector 1408. On most line circuits, the switchhook detector status is inserted in both the A and the B bit positions.

Once the line number has been entered into the channel assignment memory 234, this channel is no longer simply looped from T1 data-in 219 to T1 data-out 209. Instead, the T1 data-in is supplied to the decoder, such as 1433 in FIG. 14, and to the D2 signaling flip-flops, such as 1427 and 1428, in the line circuit. The T1 data-out is also supplied from the coder, such as 1406, as PCM and the D2 signaling bits from control, such as 1410. From line circuits connected to regular telephones, the D2 signaling bits in both the A and the B bit positions are simply the switchhook status. Thus, following a line new seizure after the channel has been assigned in channel assignment memory 234, the A and B bits change on the T1 data-out 209 for this channel from 0 (as they were in the looped condition) to 1's as they are being supplied from control 1410. These bits are now 1 since the line is now off-hook. This condition of 1's in the A and B bits will continue on the T1 line to the central office and will be received in the A and B memory locations corresponding to this channel in D2 signal receiver 360. CO CTR 305 in scanning the D2 signaling bits in circuit 360 (FIG. 3B), will detect the change of state (a stable change of state) for these D2 signaling bits and will report this change to off-hook in this channel to the processor PRO 371. This is a verification that the line has been successfully assigned to the channel and is still off-hook. This allows dial pulsing by means of D2 A and B bits to be transmitted forward from the line circuit to the D2 signaling receiver circuit 360. Also, D2 signaling bits can be sent from the D2 signaling sender 325 to the line circuit assigned to the associated channel to flip-flops 1427 and 1428 in the line circuit. This feature of sending D2 signaling to the line circuit is only used in special types of line circuits for use with PBX lines wherein one bit, such as the A bit, might indicate a request for battery reversal on a line; and another bit, such as the B bit, may indicate placing a ground on one side of the line.

At this point, it might be observed that data selector 1408 in FIG. 14, which may be a commercial item, has four inputs selectable by combinations of signals over leads LSBC 226 and ABS 227. Two of these inputs are strapped together as shown at path 1407 to extend coder 1406 to the data selector 1408 and to make the coder selectable by two of these code combinations.

By means of the LSBC and ABS pulses, selection occurs as follows, the selected input(s) being extended through data selector 1408 to its output lead LC-DO 202-0

| LSBC | ABS | Selection |
|---|---|---|
| 1 | 1 | Coder 1407 |
| 1 | 0 | |
| 0 | 1 | Control 1410 D2 A |
| 0 | 0 | Control 1410 D2 B |

For lines connected to regular telephones, the control 1410 outputs identical A and B signal levels responsive to dial pulsing, whereby these signals are converted to D2 A and B on-hook and off-hook signals comprising logic 0's and 1's, by means of the pulses on leads LSBC and ABS, for transmittal to D2 signal receiver 360, there being a string of 0's for the break period of a dial pulse, and a string of 1's for the make period.

FRAMING CIRCUIT DESCRIPTION

Reference has been made hereinbefore to the framing circuit 221 (FIG. 2C) in the line switch circuit and to the framing circuit 344 (FIG. 3B) in the central office. More detailed schematics and state diagrams for each such framing circuit are found in FIGS. 5 through 5E and a more detailed description thereof follows.

The framing circuit provides violation detection (detection of loss of frame synchronization) and reframing on the repeating 000111 pattern, associated with the 193rd bit of even frames, without disturbing the normal 6th and 12th frame identification for D2 A, B signaling purposes, thus freeing the 193rd bit of odd frames for four-kilobit per second common-channel signaling. Reframing is achieved on the average in less than 6 milliseconds. Since the framing pattern 000111 repeats only every twelve frames, a new type of framing circuit was devised to meet reframe timing requirements. The circuit requires only twelve commercially available integrated circuits packages.

The framing circuit operates in two modes: in the normal mode when frame synchronization is obtained, and in the search mode when out of synchronization but in search for synchronization.

Figure 5:
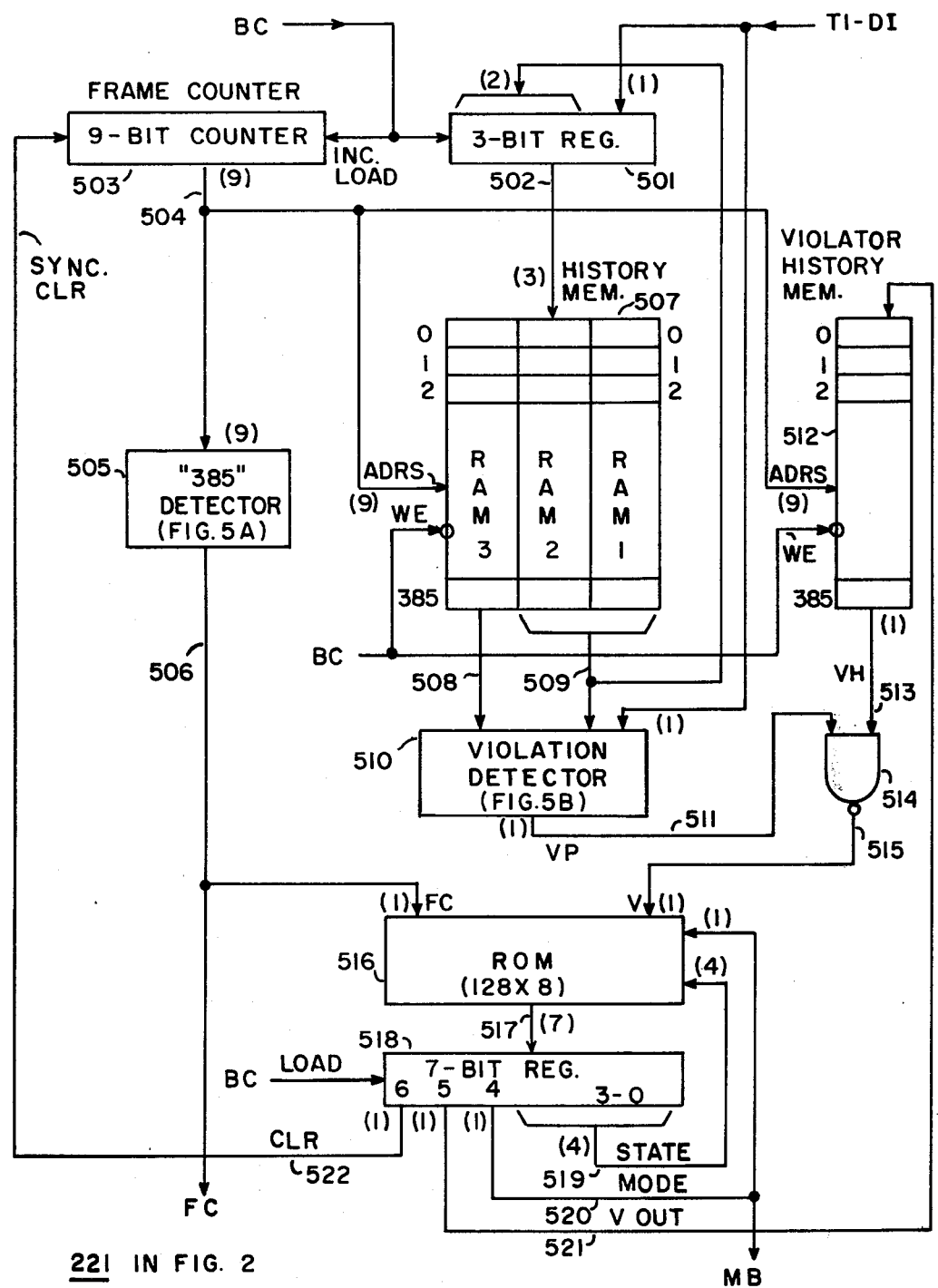
FIG. 5 is a diagram of framing circuits shown in FIGS. 2 and 3.

The exemplary framing circuit of FIG. 5 includes a history memory 507 comprised of three random access memories, RAM 1, 2 and 3. As the continuous stream of bits comprising frames arrives over path T1-DI, the bits of the first two frames become stored bit-by-bit in memory locations 0 - 385 of RAM 1. As each of these bits is stored in RAM 1, the corresponding bit which was in RAM 1 is transferred to RAM 2, and the corresponding bit which was in RAM 2 is transferred to RAM 3, supplanting the bit which was in RAM 3. This process is continuous whether the framing circuit is in the normal mode or in the search mode. Thus each RAM of the history memory stores bits of two successive frames, whereby the history memory 507 in effect, acts as a shift register for each of the 386 potential frame bit positions. Thus any position in the three RAMs provides a history of the last three bits in alternate frames.

In testing and monitoring any bit position, the framing circuit, by means of violation detector 510, effectively monitors the three bits in the history memory and the current incoming bit on T1-DI. In the normal mode, only the framing bit position, i.e., bit position 385, is tested. In the search mode, all bit positions 0 - 385 are tested.

The reason for monitoring four bits of a given bit position is as follows. Because of the framing pattern 000111000 . . ., it is necessary to examine three previous samples of the particular bit position along with the current sample to determine whether or not an out of frame (violation) condition is present. Valid combination possibilities are six, as follows:

0001
0011
0111
1110
1100
1000

The other ten combinations of four bits are invalid combinations.

Thus, in monitoring framing bit position 385 in the normal mode, if one of the six valid combinations is found, an in-frame condition is assumed. A transition to the search mode is made only if a predetermined number of monitoring checks fail, thus guarding against transfers due to transient error conditions.

Also, in looking at all 386 bit positions 0 - 385 in the search mode, it is expected that only one of the 386 positions should exhibit a continuously valid combination. Only after this valid combination remains in one and only one bit position and then persists during a predetermined number of conventional framing circuits, if a data bit position contains the framing pattern during the search mode for a time duration exceeding the confidence level check, false framing can occur.

More specifically, the following describes various elements of the framing circuit of FIG. 5.

1. Frame Counter 503.

When the framing circuit is in the normal mode, the 9-bit frame counter is used to identify the framing bit position. This counter is cleared on the bit clock pulse after a count of 385 is reached. Thus, the counter recycles every 386 bits by counting from 0 to 385. A count of 385 indicates that the framing bit position is present. The frame counter also identifies addresses in the history memories for use in the search mode. Addresses 0 to 385 in the history memories are used to store information for all potential framing bit positions.

2. History Memory 507.

As previously mentioned, history memory 507 is made up of three RAMs. This memory is used during the search mode for storing the three previous looks associated with each of the 386 potential framing bit positions. The history memory is addressed by the 9-bit frame counter to provide a different address for each of the 386 bit positions. The history memory is read during the first half of each bit time (see FIG. 5C) and written during the second half of each bit time. The information read from the history memory, along with the current T1 data bit, is used to test for a frame violation in this bit position.

When the history memory is written in the second half of the bit time, the two least significant bits read from the history memory are written into the two most significant bit positions. The current T1 data bit is written into the least significant bit position of the history memory, this information being stored in the 3-bit register before being written into the history memory. This updates this entry in the history memory for the next occurrence of this bit position (386 bits later). In the normal mode, only address 385 of the history memory is pertinent. This location contains history information associated with the current framing bit. This information is used to test for frame violations in the current framing bit position.

3. Violation History Memory 512.

Violation history memory 512 is made up of one 1K×1 RAM. This memory is addressed by the 9-bit frame counter 503 to provide a different address for each of the 386 potential framing bit positions in the search mode. Only locations addressed as 0 to 385 in the violation history memory are used. This memory is read during the first half of each bit time and written during the second half of each bit time. A bit position in this memory contains a "0" in the search mode only if a frame violation has already occurred for the associated bit position since the search began. In the normal mode, this memory is continuously loaded with "1's".

4. Violation Detector 510.

Figure 5A:
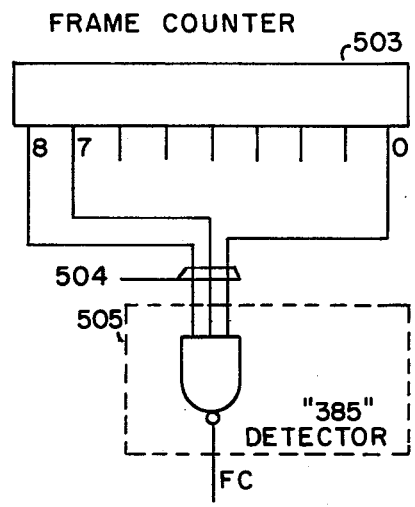
FIG. 5A is a diagram of a "385" detector shown in FIG. 5.

Violation detector 510 is used to test for frame violation in the current bit position. The circuit tests the current T1 data bit along with the three previous samples of this bit as read from the history memory. As described hereinbefore, there are six 4-bit codes using these four bits that represent valid framing patterns. The other ten possible 4-bit codes represent frame violations. The output VP511 of the violation detector 510 is a logic "0" whenever a pattern representing a frame violation is detected for the present bit sample. One possible implementation of the violation detector is shown in FIG. 5B. This implementation requires less than three integrated circuit packages.

Referring to FIG. 5B, the output 508, from RAM3 of history memory 507, represents the value of the bit received, 1158 bits prior to the current sample at path T1-DI. Path 508 is directly coupled to a first input of NAND gate 557 and to a first input of NAND gate 558 via converter 551.

The output 509B, from RAM2 of history memory 507, represents the value of the bit received 772 bits prior to the current sample at path T1-DI. Path 509B is directly coupled to a first input of NAND gate 556 and to a first input of NAND gate 555 via inverter 552.

The output 509A, from RAM1 of history memory 507, represents the value of the bit received 386 bits prior to the current sample at path T1-DI. Path 509A is directly coupled to a second input of NAND gate 555 and to a second input of NAND gate 556 via inverter 553. The outputs of NAND gates 555 and 556 are respectively coupled to second inputs of NAND gates 557 and 558. The current bit sample at T1-DI is directly coupled to a third input of NAND gate 558 and to a third input of NAND gate 557 via inverter 554. The outputs of NAND gates 557 and 558 are respectively coupled to first and second inputs of NAND gate 559. The output of NAND gate 559 is coupled to the violation detector output VP.

From an examination of the logic structure hereinabove described with reference to FIG. 5B, it is seen that detector output VP will assume a logic 0 state whenever one of the 10 non-allowed 4-bit patterns appear at detector inputs 508, 509A, 509B, and T1-DI.

5. 2-Input NAND Gate 514.

The 2-input NAND gate 514 provides an ORing function between the output VP511 of the violation detector 510 in FIG. 5 and the output VH513 of the violation history memory 512. If either VP or VH are at logic "0", the output 512 of the NAND gate 514 is logic "1". In the search mode, a "1" on the V lead indicates a framing pattern violation, either for the current sample or for a previous sample associated with the current bit position since the search began. In the normal mode, the V lead is examined only for the framing bit position to detect violations. In this case, output VH from violator history memory 512 is always "1". Thus, a "1" on output V indicates a framing pattern violation for the current framing bit sample (i.e., V = VP in the normal mode).

6. "385" Detector 505.

The output of the "385" detector 505 in FIG. 5 is a logic "0" when the frame counter 503 reaches a count of 385. The output FC of this detector on lead 506 is a logic "1" when the frame counter is in states from 0 to 384. In the normal mode, a "0" output from the detector 505 indicates the presence of the framing bit position. A "0" output from this detector causes a "0" to be entered into the CLR bit (the most significant bit) of the 7-bit register 518 via the ROM 516. This causes the frame counter to be cleared at the occurrence of the next bit clock pulse. A possible implementation for this detector that requires one 3-input NAND gate is shown in FIG. 5A. Using the implementations shown in FIGS. 5B and 5A, the violation detector 510, the 2-input NAND gate 514, and the "385" detector 505 together require three commercially-available integrated circuit packages.

7. ROM (Read Only Memory) 516.

The 128×8 ROM 516 is used to provide the combinational logic portion of a generalized sequential machine used in the implementation. If a 256×8 ROM is used, the 2-input NAND gate 514 in FIG. 5 could be eliminated by using both VP and VH as inputs to the ROM. The seven address lead inputs to the ROM are as follows:

a. FC input on lead 506.

The FC input is a "0" only when the frame counter is at a count of 385.

b. VH input on lead 515.

In the normal mode, the V input is "1" only when a framing violation pattern is present for the current framing bit sample. In the search mode, a "1" on the V input indicates a framing violation, either for the current sample or for a previous sample of the current bit position since the search began.

c. Mode MB on lead 520.

The mode bit MB on lead 520 identifies the synchronization status of the circuit as being either the normal mode or the search mode. A "0" on this lead indicates the normal mode while a "1" indicates the search mode (for an out-of-frame condition).

d. State leads 519 (4 leads).

The inputs on state leads 519 identify the current state number of the generalized sequential machine. In the normal mode and the search mode, these leads identify up to sixteen different states. Only seven of the outputs from the ROM are used. These outputs identify the next state and the outputs from the generalized sequential machine. These outputs are all entered into a 7-bit D-flip-flip register 518. The use of each of these outputs is described under item 8 immediately below.

8. 7-Bit Register 518.

The 7-bit register contains the state and outputs of the generalized sequential machine. This register along with the 3-bit register consists of two hex D flip-flop integrated circuit packages. The bit positions in this register are identified as bits 0 through 6, from the least significant bit to the most significant bit, respectively. The identity of each of the bit positions in this register is given by the following:

a. Bit 6 (CLR Lead 522).

The bit 6 position contains the logic value sent to the synchronous clear input of the frame counter. This bit in the register is loaded with a logic "0" whenever the FC input to the ROM contains a logic "0". This causes the frame counter to be cleared on the next bit clock pulse. This bit in the register is also loaded with a logic "0" in the search mode when the framing bit position has been located. This causes the frame counter to be synchronized with the framing bit position. In all other cases, this bit position in the register contains a logic "1".

b. Bit 5 (V OUT on Lead 521).

This bit position in the register is used to store information to be written into the violation history memory 512 or FIG. 5. During a reframe search, bit 5 in the register is loaded with a logic "0" whenever the V input to the ROM contains a "1". This causes a "0" to be written into the violation history memory 512 either if there is a violation pattern for the current bit sample (VP = 0) or a past sample of the current bit position since the search began (VH = 0). If both VP and VH are "1", (i.e., V = "0"), a "1" is loaded into the bit 5 position of the register, which is then written into the violation history memory 512. This indicates that a violation has not yet occurred for this bit position since the start of the frame search. In the normal mode, bit 5 in the register is continuously loaded with "1" to write all "1s" into the violation history memory 512.

c. Bit 4 (Mode Bit Over Lead 520).

The bit 4 position in the register contains the identity of the current mode, either normal mode or search mode.

d. Bits 0-3 (State Bits Over Path 519).

Bit positions 0 to 3 in the register contain the current state of the generalized sequential machine. In the normal and search modes these bits identify one of sixteen states. The ROM outputs contain the next state to be loaded into this register.

FRAMING CIRCUIT TIMING

Figure 5C:
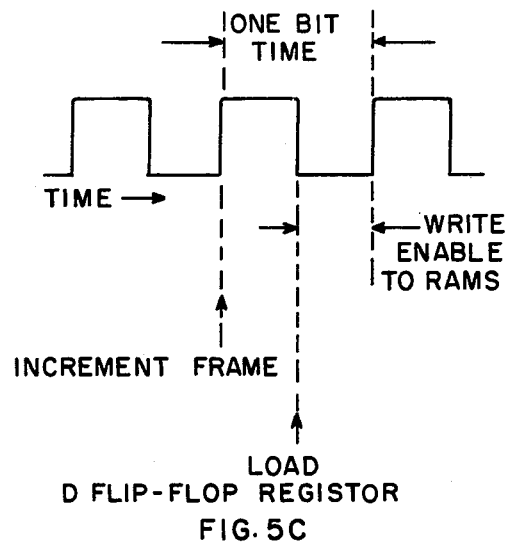
FIG. 5C is a waveform diagram showing framing circuit timing.
Figure 5B:
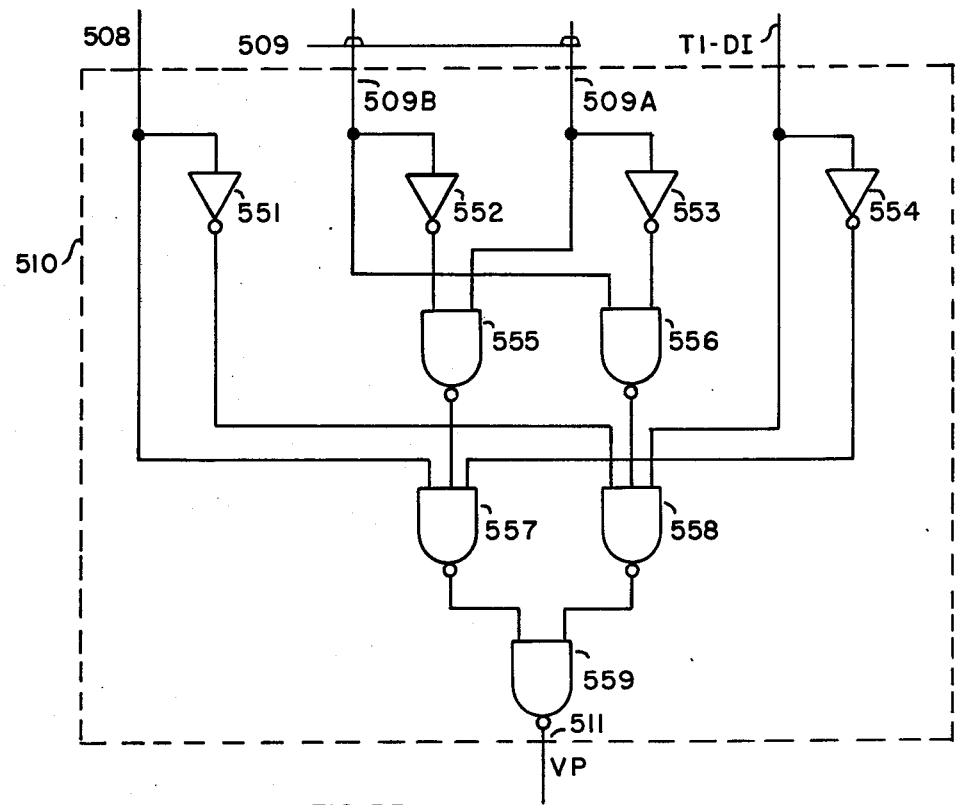
FIG. 5B is a diagram of a violation detector showin in FIG. 5.

The framing circuit timing is illustrated in FIG. 5C. The only clocking required by the framing circuit is the bit clock which is extracted from the incoming T1 line data bit stream. It is assumed that the low to high transition of the bit clock occurs at the beginning of each bit time. The bit clock then remains high for 50% of the bit time. Referring again to FIG. 5, the framing circuit actions derived from the bit clock are as follows:

a. The 9-bit frame counter 503 is incremented or synchronously cleared at the rising edge of the bit clock. This either increments or clears this counter at the beginning of each bit time.

b. The D flip-flop registers 518 and 501 are loaded at the center of each bit time on the high to low transition of the bit clock.

c. Entries into the history memory 507 and violation history memory 512 are written during the second half of each bit time by enabling the write path enable WE to these memories when the bit clock is low.

NORMAL MODE STATE DIAGRAM

Figure 5D:
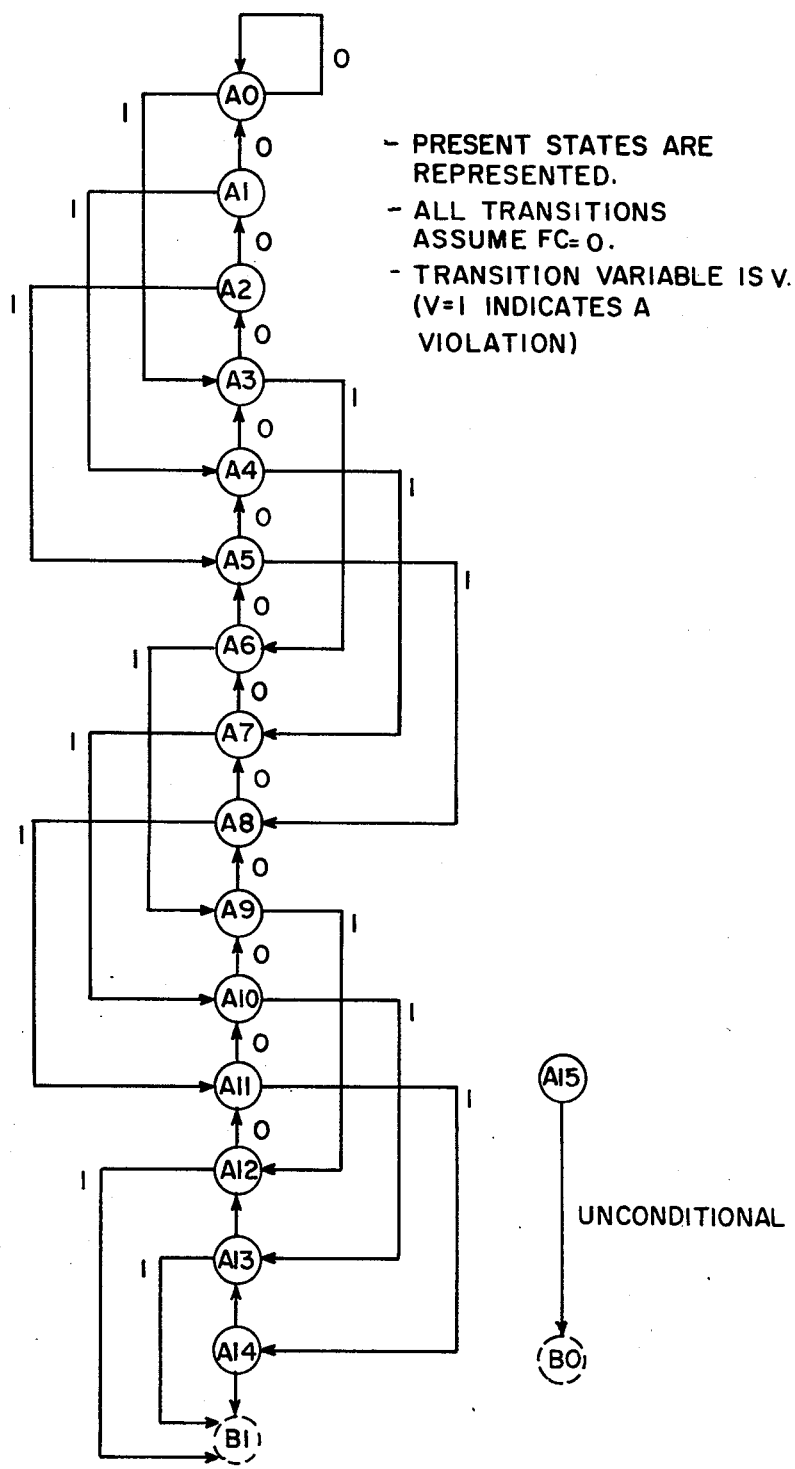
FIG. 5D is a state diagram illustrating the normal mode of the framing circuit as programmed in the ROM shown in FIG. 5.

A state diagram for the normal mode is represented in FIG. 5D. The normal mode states are represented by an "A" followed by a state number. There are sixteen states in the normal mode represented by the states A0 to A15. The search mode is represented by a "B" followed by a number. The first state entered in the search mode following a misframe declaration is State B1. State B1 is entered in transferring from the normal mode to the search mode rather than State B0. State B0 is used only to initialize the violation history memory 512 to all "1's". State B0 can be bypassed in this case, since the violation history memory is continuously loaded with "1's" in the normal mode. State A15 is not used in normal operation. If State A15 is ever entered, an unconditional transfer occurs on the first bit clock pulse to State B0. Thus, if State A15 is entered when power is first applied to the circuit or due to an error, a frame search will be initiated.

The normal mode state diagram in FIG. 5D is similar to that described in the aforementioned U.S. Pat. No. 4,016,388. However, the number of states in the normal mode has been increased to allow for greater error tolerance before declaring a misframe and entering the search mode (State B1). In the normal mode, the framing circuit is normally in State A0. State transitions in the normal mode occur only during the framing bit position (when the FC lead input to the ROM = "0"). States other then A0 are entered only if framing violation patterns are detected (V lead input into the ROM = "1"). The increased number of states in the normal mode state diagram is necessary to prevent entering the search mode due to single bit transmission errors in the framing bit position. For example, the normal framing sequence of 000111000 could become 000101000 due to a single bit transmission error in the framing bit position. In this case, a framing pattern violation will be detected for four consecutive framing bit samples. The inputs to the violation detector for these four consecutive violations are given by 0010, 0101, 1010, and 0100. These four consecutive violations will cause the framing circuit to advance to State A12. Following this, if there are no further transmission errors in the framing bit during the next twelve frames, the circuit will progress back to State A0. If the framing circuit does become out-of-frame, the circuit will rapidly progress to State B1 to initiate the search mode.

SEARCH MODE STATE DIAGRAM

Figure 5E:
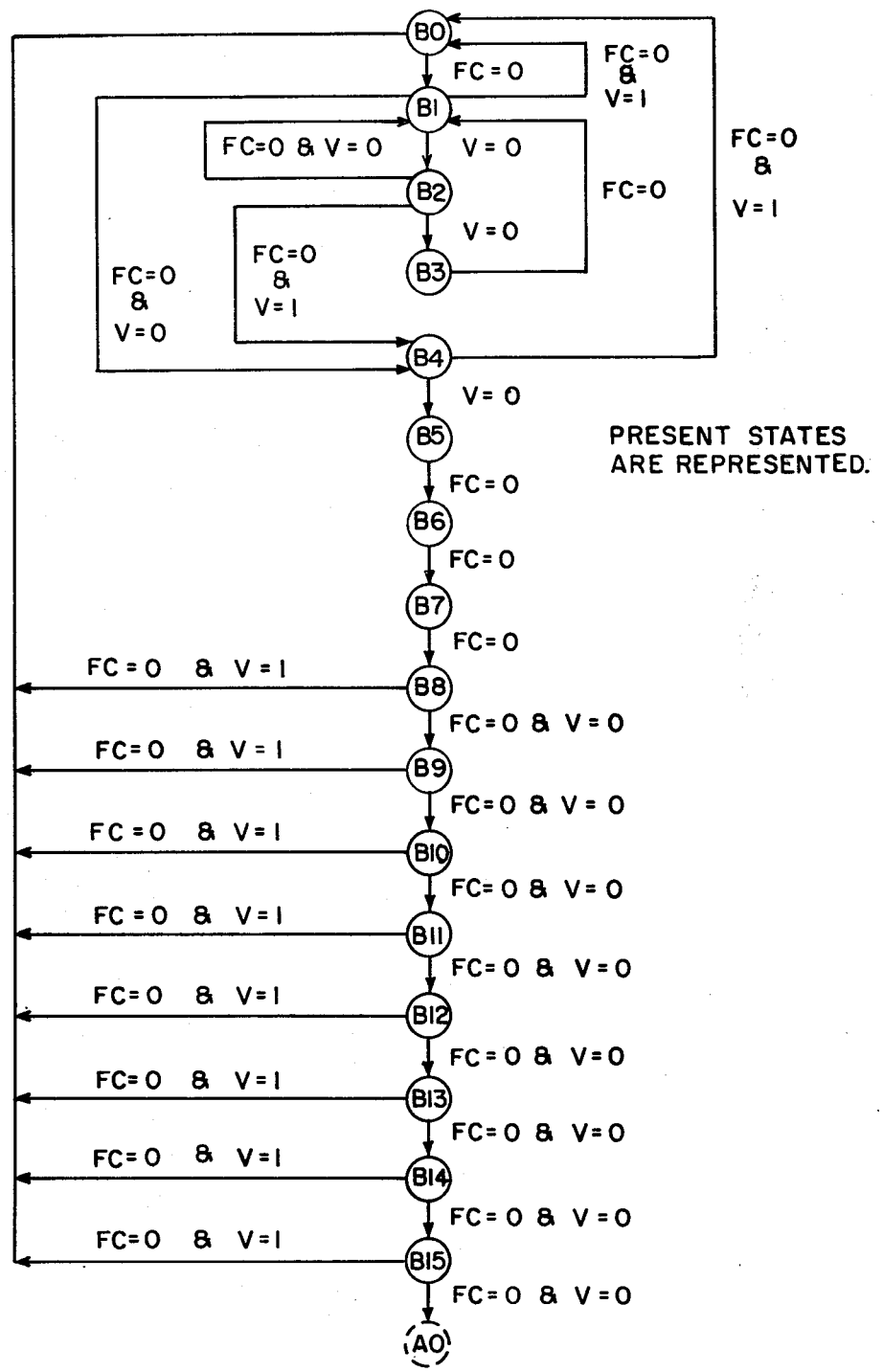
FIG. 5E is a state diagram illustrating the search mode of the framing circuit as programmed in the ROM shown in FIG. 5.

The sixteen states in the search mode state diagram are shown in FIG. 5E. A description of the states in this diagram is given by the following.

1. State B0

State B0 is entered when trouble is encountered in locating the framing bit position during the search mode. State B0 is used to initiate the search again. The transition to enter State B0 occurs when the FC lead is at logic "0". The framing circuit remains in State B0 for 386 bit times until the FC lead goes to logic "0" again, at which time the framing circuit enters State B1. While in State B0, the ROM continuously effects the application of logic "1" output on the V OUT lead. This initializes the violation history memory 512 by writing "1's" into the first 386 locations of this memory. State B0 is bypassed when a misframe condition is detected in the normal mode. In this case, State B1 can be directly entered, since the violation history memory is continuously loaded with "1's" in the normal mode.

2. State B1

The actual search for the framing bit position begins in State B1, since the B0 State is used simply to initialize the violation history memory 512. The circuit remains in State B1 until a bit position is located for which V is "0", indicating a bit position with no frame violation detected either in the current sample or the past history. On the first pass through State B1, the VH bit from violation history memory 512 is "1" for all bit positions. However, on subsequent passes through State B1 the VH lead can contain a value of logic "0" if there has been a violation on previous samples of the associated bit position. A transition from State B1 to State B2 occurs for the first bit position with no framing violation patterns following the last occurrence when lead FC became "0". If the circuit remains in State B1 until the next occurrence of lead FC going to "0", it indicates that there were frame violations for all 385 bit positions for which lead FC is "1". If lead FC goes to "0" in State B1, there are two possible transitions from State B1 as given by the following:

a. If V is "0", it indicates that this is the framing bit position and the circuit progresses to State B4.

b. If V is "1", it indicates that there were no bit positions without frame violation patterns. This is an unlikely situation, since it indicates that none of the 386 bit positions contain valid framing patterns. This condition could result if there was a transmission error in the valid framing bit position during the search of if there is a hardware fault condition. In this case, the framing circuit returns to State B0 to reinitiate the violation history memory to all "1's". In this case, the search for the valid framing bit is initiated again.

3. State B2

The circuit enters State B2 when the first framing bit candidate (following the last occurrence of lead FC becoming "0") is located. If another framing bit candidate is located before the next occurrence of lead FC going to "0", the circuit progresses to State B3. If the circuit remains in State B2 until the next occurrence of lead FC going to "0", there are two possible transitions from State B2 as given by the following:

a. If V is "1", the bit position for which lead FC = "0" is not a framing bit candidate. This indicates that there is one and only one remaining framing bit candidate in all 386 bit positions sample. In this case, the framing circuit progresses to State B4.

b. If V is "0", it indicates that the bit position for which lead F = "0" is a second framing bit candidate. In this case the framing circuit returns to State B1.

4. State B3

The circuit enters State B3 when a second framing bit candidate occurs in the first 385 bit positions being examined. Entering State B3 indicates that there are still two or more framing bit candidates. The circuit remains in State B3 until the next occurrence of lead FC going to "0", at which time the circuit progresses to State B1 again. Thus, the circuit returns to State B1 every 386 bit positions. The circuit continues to loop through States B1, B2, and B3 until a pass through all 386 bit positions results in one and only one framing bit candidate, in which case the circuit progresses to State B4.

5. State B4

The circuit enters State B4 when there is one and only one remaining framing bit candidate. The circuit remains in this state until this only remaining candidate occurs again (indicated by $V = $ "0") at which time the circuit progresses to State B5. At the time of this state transition, the ROM also outputs a logic "0" on the CLR lead, to provide a synchronous clear to the frame counter. This causes the frame counter to be cleared at the next occurrence of the bit clock. This synchronizes the frame counter to the new framing bit position. If the circuit remains in State B4 for all 386 bit positions without detecting the framing bit candidate, the circuit returns to State B0. This is an unlikely situation in which a frame violation has occurred for the only remaining candidate. This transition back to State B0 occurs if lead FC goes to "0" and lead V is a logic "1".

6. States B5, B6, and B7

The circuit enters State B5 upon an occurrence of the new framing bit position. States B5, B6, and B7 provide a delay that requires three more occurrences of the new framing bit position before the circuit advances to the State B8. This delay allows location "385" in the history memory 507 to be updated for the new framing bit position. This location in the history memory is used for detecting frame violations associated with the new framing bit position.

7. States B8 to B15

The circuit enters State B8 when history memory location "385" has been updated for the new framing bit position. States B8 to B15 are used to establish confidence that this actually is a framing bit position before entering the normal mode. Establishing a confidence level prevents the circuit from oscillating back and forth between the search mode and normal mode in trouble conditions when a stable framing bit position cannot be found. In this manner, the new framing bit position is verified to be stable before returning to the normal mode (State A0). For States B8 to B15, transitions are made only during the new framing bit position, when lead FC goes to "0". During this bit position, if lead V is "0", the circuit progresses to the next higher numbered state. If lead V is at logic "1", it indicates a framing violation pattern has been detected for the new framing bit position. In this case, the circuit returns to State B0 to begin the reframe search again.

MISFRAME DETECTION TIME AND REFRAME TIME

As mentioned above, the state diagram in FIG. 5D requires detection of more violations to reach the search mode than for the approach proposed for standard D2 framing in U.S. Pat. No. 4,016,388. However, it is expected that the average misframe detection time for the proposed circuit is as fast as the misframe detection time in the circuits of U.S. Pat. No. 4,016,388 for the D2 approach (1.89 ms). This is true since the D2 approach examines only the preceding framing bit along with the current sample in detecting a violation. In this case, in a misframe condition there is a 50% chance of detecting a violation at each frame sample. In the proposed circuit, in the normal mode, the current framing sample is examined along with three previous samples of the framing bit. In this case, there is a 10 out of 16 or 62.5% chance of detecting a violation at each sample during a misframe condition. Thus when misframing occurs, the circuit should rapidly progress from State A0 to State B0.

Estimates indicate that the average time to reduce the number of framing bit candidates to one and only one (in the loop of States B1, B2, and B3 in FIG. 5E) is only 2.25 ms. Following this, another 13 occurrences of the framing bit position of 3.25 ms are necessary to progress from State B2 to State A0. Thus, the total average reframe time is only 5.5 msec. Next the probability of reframing within 10 ms will be considered. In this case, the time allowed to reduce to one and only one framing bit candidate is $10 - 3.25 = 6.75$ ms. This allows $6.75/0.25 = 27$ passes through the loop of States B1, B2, and B3 in FIG. 5E. The probability of reframe within 10 ms is then given by the following:

$$[1 - 6/16 \cdot 1/2 \cdot 26] \cdot 385 = 0.999998$$

Thus, the probability of reframe within 10 ms is 0.999998.

It should be observed that this framing arrangement could also be applied for framing on the standard D2 frame pattern of 010101 with a reduction in reframe timing. A modification of the circuit for standard D2 framing would reduce the history memory 507 to one $1K\times_1$ RAM and change the violation detector 510 to an exclusive OR gate.

This principle can also be used to achieve fast framing on any repetitive pattern by choosing the appropriate number of bits in the history memory width and by designing the appropriate violation detector. For example, the circuit could easily be modified to frame on a 000101000101 ... pattern by using a 3-bit wide history memory with a different violation detector. In this case, all patterns to the violation detector other than 0001, 0010, 0101, 0100, 1010 and 1000 are violations. There is a remote possibility of falsely framing on the sign bit of a PCM channel carrying a 666-⅔ Hz signal, thus causing trouble by simulating the repeating 000111 pattern. This could be reported as an alarm by means of the MB lead. The alternative repeating 000101 pattern can be optionally used to eliminate this remote possibility.

Additionally, there are other repeating patterns, apart from 000111 and 000101, adaptable to providing sixth and twelfth D2 signaling frame identification and frame synchronization. These patterns are:
000001
000011
001011
001101
001111
010111
011001
011111

Use of any of these alternatives would, of course, require appropriate modification of clock decoding circuitry and D2 clock extraction circuitry. Such modification, in view of the preferred embodiment, would be obvious to those of ordinary skill in the art and will not be set forth in detail.

GENERAL PURPOSE FRAMING CIRCUITS

In general, the framing circuitry shown in FIG. 5 can be used to frame on any repetitive framing pattern. Also, the length of a frame (that is the number of bits between framing bit positions) can be any number. Changes in circuitry necessary to adapt this framing approach for other framing patterns and other frame lengths are given by the following:

1. The frame counter 503 must have sufficient bits to count the number of bit positions between framing bits. For example, in the case where there are 386 bits between framing bits positions, this counter must have sufficient bits (9 bits) to count up to 385.

2. The detector 505 should be chosen to detect a count one less than the number of bit positions corresponding to the framing bit repetition rate. For example, if the framing bit occurs every 386 bits, this detector should detect a count of 385.

3. For framing on other patterns, the number of columns in the history memory 507 may either decrease or increase. Also, the number of bits in each column of the history memory must correspond to the number of bit positions between repetitions of the framing bit position. The register 501 must be chosen to be equal in width to the width of the history memory 507. The required width of the history memory is determined by examination of the repetitive framing pattern. At each bit position, the outputs from the history memory along with a current bit sample are examined to determine if the current sample indicates a frame violation or not. The width of the history memory must be chosen such that the previous samples from the history memory along with the current bit sample provide sufficient bits such that at least half of the possible patterns for this number of bits (number of history bits plus current bits) indicates framing violations. If this number of bits is chosen such that at least half of the pattern indicate framing violations, then reframing can be achieved rapidly. The history memory width could be reduced such that less then half of the patterns indicate frame violations. However, in such case the reframe time is increased. The history memory must be chosen at least sufficiently wide such that some of the patterns (of the history memory output plus the current sample) indicate the frame violations.

4. The violation detector circuit must be of a combinational logic design such that it appropriately indicates whether the pattern presented to its inputs indicate a framing violation pattern, or not, on the VP output lead 511. The inputs are simply previous samples of the current bit position from the history memory along with the current sample of this bit position. The violation detector 510 could provide this combination logic function with a ROM.

5. The number of bits in the violation history memory column 512 must be equal to the number of bit positions corresponding to the repetition rate of the framing bit position.

The remaining portions of the framing circuit remain as shown in FIG. 5. The search modes state diagram remains as shown in FIG. 5E. The number of states provided for gaining confidence in the framing bit position, once one and only one candidate remains (states from B8 through B15), could be increased or decreased if the confidence level is to by changed. The normal mode state diagram remains as shown in FIG. 5D. The number of states in this diagram could be increased or decreased depending on the violation failure rate desired before a search is initiated.

While I have disclosed certain illustrative embodiments of my invention, it will be readily understood by those skilled in the art that modifications may be made without departing from the spirit and scope of my invention. My invention, therefore, is to be considered as limited only by the scope of the appended claims.

I claim:

1. In a frame-organized time division multiplex system wherein each frame comprises a plurality of multi-bit information channels and at least one additional bit, and wherein predetermined frames are used to substitute signaling information in at least one predetermined bit position of each multibit information channel, a method for utilizing said at least one additional bit for providing combined frame synchronization and reframing, frame identification of said predetermined frames, and common channel signaling, said method comprising the steps of:
  (a) generating in said at least one additional bit position of the even-numbered frames a repetitive bit pattern suitable for identifying said predetermined frames,
  (b) generating a frame synchronization status signal by monitoring successive received signal states in said at least one additional bit position of said even-numbered frames,
  (c) reframing by monitoring for the presence of said repetitive bit pattern whenever said status signal indicates absence of frame synchronization, and
  (d) performing common channel signaling in said at least one additional bit position of the odd-numbered frames whenever said status signal indicates presence of frame synchronization.

2. A method as set forth in claim 1, wherein said predetermined frames comprise every sixth and twelfth frame, and wherein said at least one predetermined bit position comprises the least significant bit position of each channel of said predetermined frames.

3. A method as set forth in claim 2, wherein said repetitive bit pattern comprises the binary sequence 000111.

4. A method as set forth in claim 2, wherein said repetitive bit pattern comprises the binary sequence 000101.

5. In a frame-organized time division multiplex system including information sending and receiving means, wherein each frame comprises a plurality of multibit information channels and at least one additional bit, and wherein predetermined frames are used to substitute signaling information in at least one predetermined bit position of each multibit information channel, apparatus for effecting combined frame synchronization and reframing, identification of said predetermined frames, and common channel signaling, said apparatus comprising;

means, coupled to said information sending means, for generating in said at least one additional bit position of consecutive even-numbered frames a repetitive bit pattern suitable for use in identifying said predetermined frames, framing means having an input coupled to said information receiving means, including detection means for examining each bit position of consecutive pairs of frames for the occurrence of said repetitive bit pattern, framing control means coupled to said detection means operative to generate a first synchronization status signal whenever said repetitive bit pattern is detected in said at least one additional bit position of consecutive even-numbered frames and to generate a second synchronization status signal whenever said repetitive bit pattern is not so detected, said framing control means further operative to monitor for the subsequent reoccurrence of said repetitive bit pattern in one, and only one, bit position of said consecutive even-numbered frames whenever said second status signal is generated, and common channel signaling means, coupled to said framing means and to said sending means, operative to insert signaling information into said at least one additional bit position of the odd-numbered frames sent by said sending means whenever said first status signal is generated.

6. Apparatus as set forth in claim 5 wherein said predetermined frames comprise every sixth and twelfth frame, and wherein said at least one predetermined bit position comprises the least significant bit position of each channel of said predetermined frame.

7. Apparatus as set forth in claim 6 wherein said repetitive bit pattern comprises the binary sequence 000111.

8. Apparatus as set forth in claim 6 wherein said repetitive bit pattern comprises the binary sequence 000101.

9. Apparatus as set forth in claim 5 wherein said detection means further comprises;

history memory means coupled to said framing means input, including at least a plurality of individually addressable memory locations equal to the total number of bit positions of a pair of consecutively received frames, each of said memory locations having capacity to store signal values received in the corresponding frame bit position for a predetermined number of previously received frames, means for reading any of said memory locations and placing the results on said predetermined number of history memory means outputs, and combinational logic means having inputs coupled to said history memory means outputs and to said framing means input, operative during each received frame bit position to generate at the detection means output a first violation signal whenever the concatenated signal values from said history memory means outputs along with the signal value for the bit position currently being received do not correspond to a valid subsequence of said repetitive bit pattern.

10. Apparatus as set forth in claim 9 wherein said framing control means further comprises;

violation history memory means for storing a plurality of indicator bit each corresponding to a bit position of the pair of consecutively received frames whose history bit signal values are stored in said history memory means, a sequential state logic machine having a first output coupled to means for writing into said violation history memory means and a second output for indicating the presence of said first and second synchronization status signals, said second output coupled to a first input of said sequential state logic machine, a combinational logic element having a first input coupled to said detection means output and a second input coupled to means for reading out the contents of any location of said violation history memory means, said logic element operative to logically OR the signals appearing on its first and second inputs to an element output coupled to a second input of said sequential state logic machine;

whereby said sequential state logic machine is operative as connected to examine only said at least one additional bit position of even-numbered frames for the presence of said repetitive bit pattern whenever said first synchronization status signal is generated and to examine every frame bit position in conjunction with said history memory means and said violation history memory means for said repetitive bit pattern whenever said second synchronization status signal is generated.

11. Apparatus as set forth in claim 10 wherein the combinational logic portion of said sequential state logic machine comprises a read-only memory means programmed to provide a plurality of logic states suitable for use in detecting with transient filtering the loss of frame synchronization in said at least one additional bit of even-numbered frames and for use in searching for the reoccurrence of said repetitive bit pattern in one, and only one, bit position of said even-numbered frames for a predetermined confidence time interval whenever loss of frame synchronization is indicated by said second synchronization status signal.

* * * * *